(12) United States Patent
Osawa et al.

(10) Patent No.: US 7,619,344 B2
(45) Date of Patent: Nov. 17, 2009

(54) ARMATURE OF ROTARY ELECTRIC MACHINE AND MANUFACTURING METHOD THEREOF

(75) Inventors: Yutaka Osawa, Kiryu (JP); Shingo Watanabe, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 562 days.

(21) Appl. No.: 10/574,698

(22) PCT Filed: Oct. 7, 2004

(86) PCT No.: PCT/JP2004/015181

§ 371 (c)(1),
(2), (4) Date: Apr. 11, 2006

(87) PCT Pub. No.: WO2005/036724

PCT Pub. Date: Apr. 21, 2005

(65) Prior Publication Data

US 2006/0220489 A1    Oct. 5, 2006

(30) Foreign Application Priority Data

Oct. 8, 2003    (JP) .............................. 2003-349742

(51) Int. Cl.
*H02K 1/00* (2006.01)
(52) U.S. Cl. ...................................... 310/198; 310/234
(58) Field of Classification Search .................. 310/179, 310/184, 233–234, 198
See application file for complete search history.

(56) References Cited

U.S. PATENT DOCUMENTS

| | | | | |
|---|---|---|---|---|
| 4,292,559 A | * | 9/1981 | Auinger et al. | 310/206 |
| 4,876,472 A | * | 10/1989 | Shiraki et al. | 310/198 |
| 6,694,599 B1 | * | 2/2004 | Kershaw et al. | 29/597 |
| 6,822,365 B2 | * | 11/2004 | Mori | 310/234 |
| 6,841,914 B2 | * | 1/2005 | Maeda et al. | 310/198 |
| 6,888,285 B2 | * | 5/2005 | Ito et al. | 310/233 |
| 6,891,304 B1 | * | 5/2005 | Cros et al. | 310/198 |
| 6,930,429 B2 | * | 8/2005 | Wang | 310/225 |
| 2004/0021394 A1 | * | 2/2004 | Maeda et al. | 310/233 |
| 2004/0256944 A1 | * | 12/2004 | Kaneko | 310/233 |
| 2005/0184612 A1 | * | 8/2005 | Cros et al. | 310/158 |
| 2005/0206268 A1 | * | 9/2005 | Walter et al. | 310/225 |

FOREIGN PATENT DOCUMENTS

| | | |
|---|---|---|
| JP | A 62-181651 | 8/1987 |
| JP | A 10-271788 | 10/1998 |
| JP | A 2002-305861 | 10/2002 |
| JP | A 2003-102155 | 4/2003 |

* cited by examiner

Primary Examiner—Thanh Lam
(74) Attorney, Agent, or Firm—Oliff & Berridge, PLC

(57) ABSTRACT

In a rotary electric machine, coils to be wound around an armature are wound so as to have a good magnetic balance. In a rotary electric machine formed with four poles, ten slots, and twenty commentator segments, a pair of coils that respectively conduct an electric current to the commutator segments adjoining an arbitrary commutator segment at both sides in the circumferential direction are caused to face permanent magnets, that are adjoining poles, to be poles opposite from each other, and one coil is wound in a normal winding state, and the other coil, in a reverse winding state.

7 Claims, 17 Drawing Sheets (A)

(B)

Fig. 17
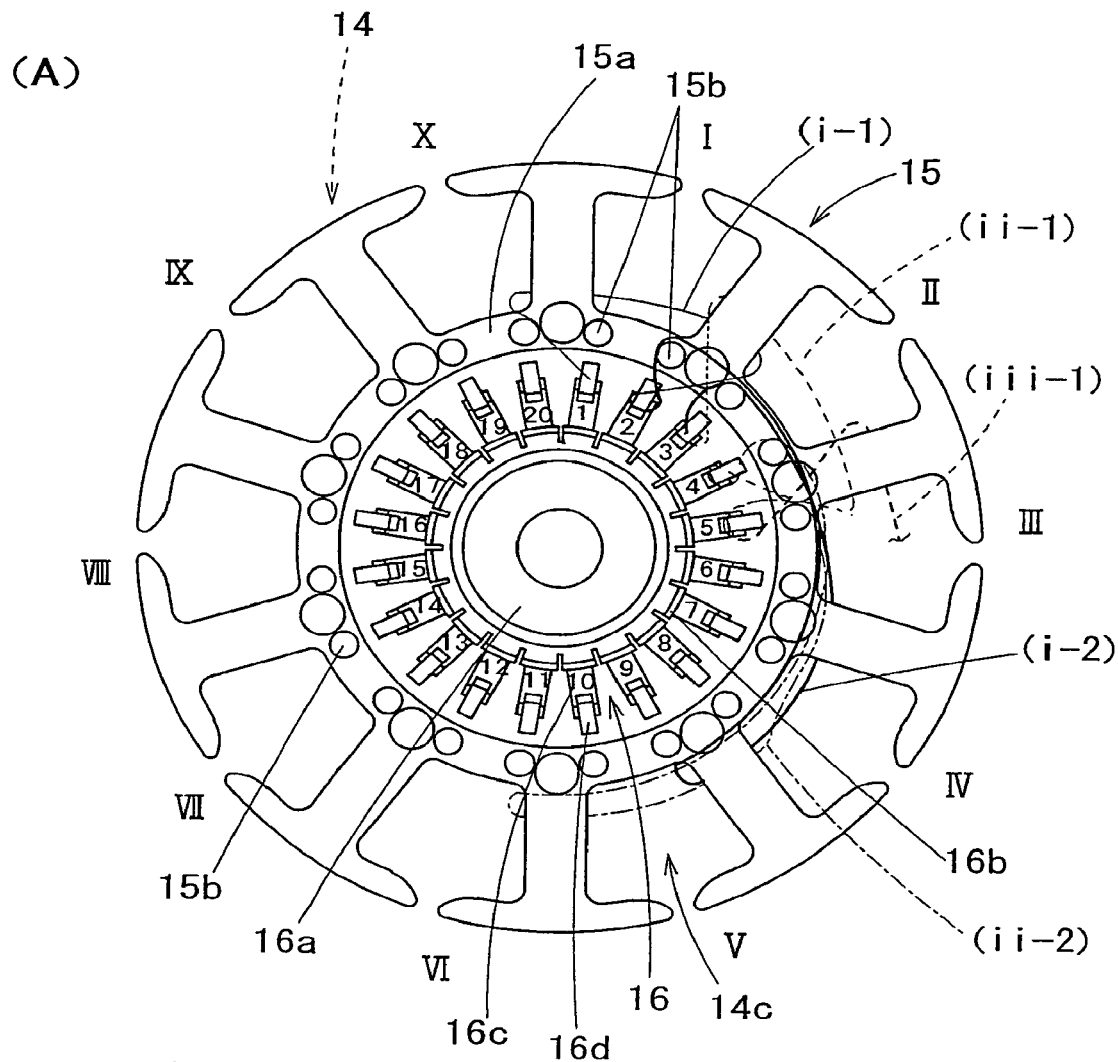
(A)
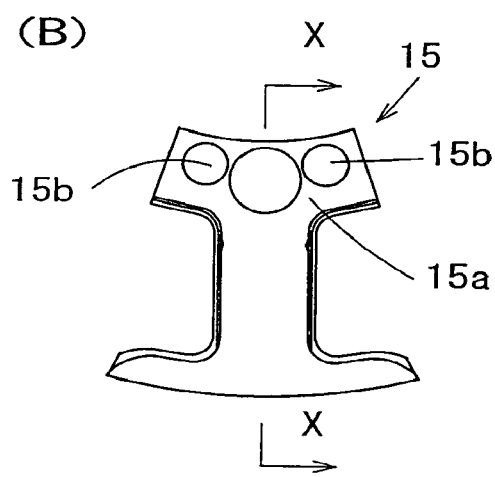
Fig. 17 (B)
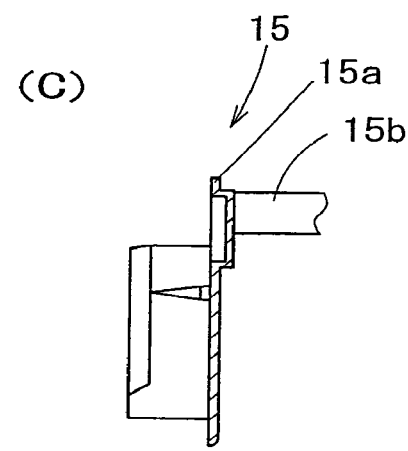
Fig. 17 (C)

ARMATURE OF ROTARY ELECTRIC MACHINE AND MANUFACTURING METHOD THEREOF

This application is the U.S. National Stage of PCT/JP 2004/015181, filed Oct. 7, 2004, which claims priority from JP 2003-349742, filed Oct. 8, 2003, the entire disclosures of which are incorporated herein in the entireties by reference thereto.

BACKGROUND

The disclosure relates to the technical field of an armature of a rotary electric machine that is mounted on, for example, a vehicle and a manufacturing method thereof.

Generally, as this type of rotary electric machine, known is an electric motor. The electric motor has a yoke where magnetic poles are formed by a plurality of pairs of permanent magnets provided on the inner circumferential surface and an armature. A plurality of slots are formed in the armature extending in an axial direction around the circumferential direction on the outer periphery of a core. A plurality of coils, each coil formed by winding wire wound in the slots with a predetermined interval, conduct an electric current to adjoining commutator segments. When a high torque, as well as a reduction in size, are demanded in such an electric motor, the demand has been satisfied by providing the electric motor with multiple poles by using a plurality of pairs of permanent magnets and increasing the number of commutator segments and slots. However, in such an electric motor, it has been known that, when the commutator segments around which and to which coil ends are hung and connected and coil winding positions are lap-wound in a state where these are almost opposed in the axial direction, magnetic imbalance occurs to cause whirling based on a torque ripple and the like.

As a remedy therefore, it has been promoted to form coils by winding a winding wire that conducts an electric current to arbitrary commutator segments around the preset arbitrary slots and the slots facing the arbitrary slots in the radial direction in a state of series connection and to thereby improve magnetic balance (see Japanese Published Unexamined Patent Application No. 2002-305861).

SUMMARY

However, the conventional art described above is carried out in an armature having slots and commutator segments provided in the same number, and there is no suggestion of the case of a structure where slots are provided with half as many as segments, which is a problem to be solved by the invention.

In consideration of the foregoing circumstances, the invention has been made to, at least, solve the identified problems. As disclosed, a rotary electric machine including an armature on which a plurality of coils, each coil formed by a winding wire wound around the slots with a predetermined number of slots therebetween out of a plurality of slots provided side by side in a circumferential direction, conduct an electric current to adjoining commutator segments and a yoke provided with magnetic poles. The slots are provided with half the number of commutator segments, and the coils are formed as a pair of coils respectively that conduct an electric current to commutator segments adjoining at both sides in the circumferential direction with reference to an arbitrary commutator segment, the pair of coils face opposite poles positioned differently from each other, and one coil is wound in a normal winding state, and the other coil, in a reverse winding state. With this structure, magnetic balance of the armature can be improved.

In one case, the rotary electric machine is formed with N magnetic poles, n pieces of slots, and 2n pieces of commutator segments, a pair of coils that respectively conduct an electric current to three commutator segments adjoining at both sides in the circumferential direction with reference to an arbitrary commutator segment having an angle of approximately (360/N), and one thereof is wound as a normal winding coil, and the other, as a reverse winding coil. With this structure, magnetic balance of the armature can be improved.

In another case, the rotary electric machine is formed with N magnetic poles, n pieces of slots, and 2n pieces of commutator segments in which a number (2n/N) obtained by dividing the number of commutator segments by the number of magnetic poles is a natural number, and ((2n/N)−1) coils formed in a manner respectively conducting an electric current to (2n/N) pieces of arbitrary commutator segments adjoining in the circumferential direction are wound so as to respectively have an angle of approximately $\{(1+2m)\times(360/N)\}$ where m is a natural number including 0 and the coils are wound so that a normal winding alternates with a reverse winding. With this structure, magnetic balance of the armature can further be improved.

The coils are wound with one slot therebetween, and with this structure, a reduction in size and weight, a reduction in cost, and high efficiency can be realized.

Further, the rotary electric machine including an armature on which a plurality of coils, each coil formed by a winding wire wound around the slots with a predetermined number of slots therebetween out of a plurality of slots provided side by side in a circumferential direction, conduct an electric current to adjoining commutator segments and a yoke provided with magnetic poles, the slots are provided in half the number of commutator segments, the coils are formed as pairs of coils that respectively conduct an electric current to commutator segments adjoining at both sides in the circumferential direction with reference to an arbitrary commutator segment, each pair of coils face the same poles positioned different from each other, and the respective coils are wound in the same winding direction. With this structure, magnetic balance of the armature can be improved.

The rotary electric machine is formed with N magnetic poles, n pieces of slots, and 2n pieces of commutator segments, a pair of coils that respectively conduct an electric current to three commutator segments adjoining at both sides in the circumferential direction with reference to an arbitrary commutator segment have an angle of approximately (360×2/N), respective coils are wound in the same winding direction. With this structure, magnetic balance of the armature can be improved.

The coils are wound with one slot therebetween, and with this structure, a reduction in size and weight and a reduction in cost can be realized.

In the armature, two layers of coils are wound in a radial direction, and with reference to an arbitrary slot, a pair of first coils in the radial direction to be wound with the arbitrary slot therebetween and a pair of second coils in the radial direction to be wound with a slot adjoining the arbitrary slot therebetween are wound at a winding amount based on a preset ratio. With this structure, commutation is improved so that durability of the brushes can be enhanced.

In the first and second coils, each pair of coils are wound with a positional displacement from each other in the radial direction, and with this structure, not only is commutation improved so that durability of the brushes can be enhanced, but also a space factor is improved so that a reduction in size and weight can be realized.

Further, adjoining slots are formed so that a groove width of one slot is narrow at an inner radial side and wide at an outer radial side and a groove width of the other slot is wide at an inner radial side and narrow at an outer radial side. With this structure, the space factor can be further improved so that a reduction in size and weight can be realized.

Further, in a method for producing an armature of a rotary electric machine, a plurality of coils, each coil is formed on the armature by a winding wire wound around the slots with a predetermined number of slots therebetween out of a plurality of slots provided side by side in a circumferential direction, conduct an electric current to adjoining commutator segments. A yoke is provided with magnetic poles, in which the slots are provided with half the number of commutator segments, and the coils are wound, while arranging a pair of coils that respectively conduct an electric current to commutator segments adjoining at both sides in the circumferential direction with reference to an arbitrary commutator segment so as to cause the same to face opposite poles positioned different from each other, so that one coil results in a normal winding, and the other coil, a reverse winding. With this structure, magnetic balance of the armature can be improved.

In one method, the rotary electric machine is formed with N magnetic poles, n pieces of slots, and 2n pieces of commutator segments, a pair of coils that respectively conduct an electric current to three commutator segments adjoining at both sides in the circumferential direction with reference to an arbitrary commutator segment have an angle of approximately (360/N), and one thereof is wound as a normal winding coil, and the other, as a reverse winding coil. With this structure, magnetic balance of the armature can be improved.

In another method, the rotary electric machine is formed with N magnetic poles, n pieces of slots, and 2n pieces of commutator segments in which a number (2n/N) obtained by dividing the number of commutator segments by the number of magnetic poles is a natural number, and ((2n/N)−1) coils formed in a manner respectively conducting an electric current to arbitrary (2n/N) commutator segments adjoining in the circumferential direction are wound so as to respectively have an angle of approximately {(1+2m)×(360/N)} where m is a natural number including 0 and so that a normal winding alternates with a reverse winding. With this structure, magnetic balance of the armature can further be improved.

Further, the coils are wound with one slot therebetween. With this structure, a reduction in size and weight and a reduction in cost can be realized.

In another method for producing an armature, of a rotary electric machine, on which a plurality of coils, each coil formed by making a winding wire wound around the slots with a predetermined number of slots therebetween out of a plurality of slots provided side by side in a circumferential direction, conduct an electric current to adjoining commutator segments and a yoke provided with magnetic poles. The slots are provided with half the number of commutator segments, and the coils are provided, while arranging a pair of coils that respectively conduct an electric current to commutator segments adjoining at both sides in the circumferential direction with reference to an arbitrary commutator segment so as to cause the same to face the same poles positioned different from each other, so that the respective coils are wound in the same winding direction. With this structure, magnetic balance of the armature can be improved.

In this method, the rotary electric machine is formed with N magnetic poles, n pieces of slots, and 2n pieces of commutator segments, a pair of coils, that respectively conduct an electric current to three commutator segments adjoining at both sides in the circumferential direction with reference to an arbitrary commutator segment, has an angle of approximately (360×2/N), and the respective coils are wound in the same winding direction. With this structure, magnetic balance of the armature can further be improved.

Thus, the coils are wound with one slot therebetween, and, with this structure, a reduction in size and weight and a reduction in cost can be realized.

In the armature, two layers of coils are wound in a radial direction, and with reference to an arbitrary slot, a pair of first coils in the radial direction are wound with the arbitrary slot therebetween and a pair of second coils in the radial direction are wound around the arbitrary slot and adjoining the first coils in the circumferential direction are wound at a winding amount based on a preset ratio. With this structure, commutation is improved so that durability of the brushes can be enhanced.

In the first and second coils, each pair of coils are wound with a positional displacement from each other in the radial direction. With this structure, not only is commutation improved so that durability of the brushes can be enhanced, but also the space factor is improved so that a reduction in size and weight can be realized.

Adjoining slots are formed so that a groove width of one slot is narrow at an inner radial side and wide at an outer radial side and a groove width of the other slot is wide at an inner radial side and narrow at an outer radial side. With this structure, the space factor can further be improved so that a reduction in size and weight can be realized.

In the disclosed apparatus and method, whirling is reduced, whereby vibration and noise can be reduced, and a high-performance rotary electric machine can be provided.

Also a reduction in size and weight, a reduction in cost, and high efficiency can be realized.

Additionally, commutation is improved so that durability of the brushes can be enhanced.

Further, the space factor is improved so that a reduction in size and weight can be realized.

BRIEF DESCRIPTION OF THE DRAWINGS

The disclosure will be made with reference to the drawings, in which:

FIGS. 17(A), (B), and (C) are a pattern cross-sectional view of an armature for explaining a wound state of coils, a front view of an insulator, and a cross-sectional view along 17-17 of FIG. 17(B) according to a ninth embodiment, respectively.

DETAILED DESCRIPTION OF EMBODIMENTS

Figure 1:
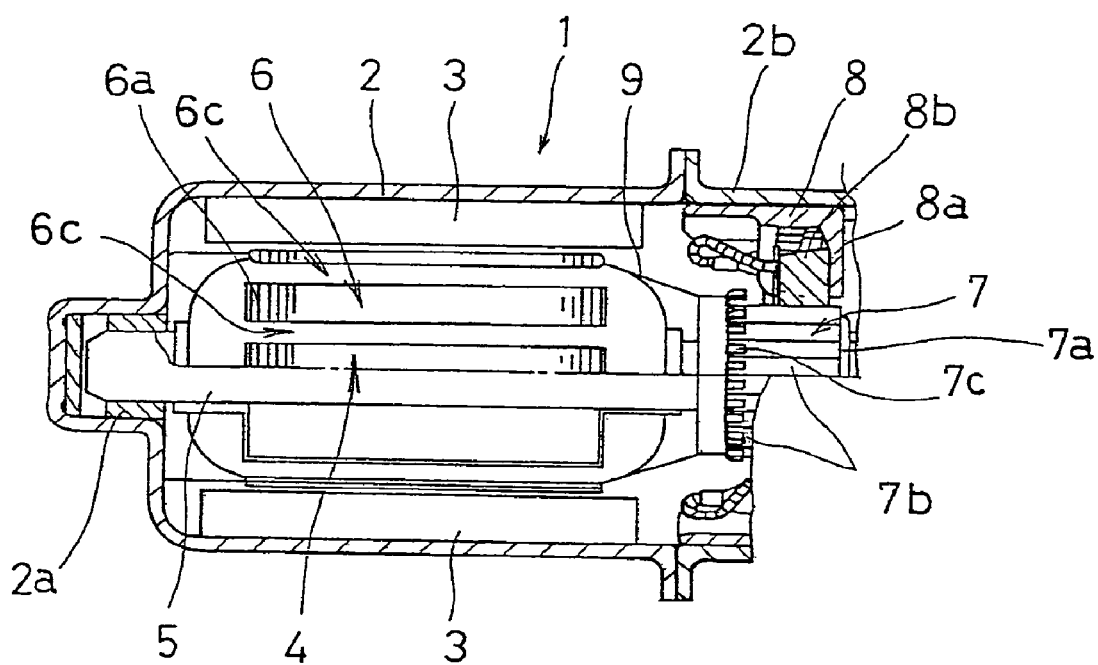
FIG. 1 is a cross-sectional, partially-cutaway side view of an electric motor.

Next, a first exemplary embodiment will be described with reference to FIGS. 1 to 5. In the drawings, reference numeral 1 designates an electric motor (rotary electric machine) used as a driving source of electric equipment mounted on a vehicle. To the inner circumferential surface of a yoke (motor housing) 2, that is a component of the electric motor 1 and is formed in a cylindrical form with a bottom, permanent magnets 3 are fixed so that two pairs of N and S poles are formed in a circumferential direction, whereby the electric motor is formed as a quadrupole electric motor 1. Reference numeral 4 designates an armature. To a shaft (armature shaft) 5 that is a component of the armature 4, a core 6, formed by laminating a plurality of ring-shaped plates 6a, is externally fitted in an integrated manner. A commutator 7, positioned at a front end of the core 6, is externally fitted and fixed to the shaft 5. The shaft 5 of the armature 4 is rotatably supported at its base end by the yoke 2 via a bearing 2a, and is internally provided so as to be freely rotatable in the yoke 2. Also, a cover 2b is provided at an open end of the yoke 2, and a holder stay 8 is integrally provided on the cover 2b. Brush holders 8a positioned at four circumferential points are formed in the holder stay 8. Brushes 8b are internally provided in the brush holders 8a so as to be freely protruded and depressed. As a result, the protruding ends of the brushes 8b abut (contact) the commutator 7. An external electric supply is supplied to the commutator 7 via the brushes 8b. These basic structures are formed according to a conventional technique.

Formed on the outer periphery of the ring-shaped plates 6a forming the core 6, are ten teeth 6b. Each tooth 6b is shaped like the capital letter T. By externally fitting a plurality of plates out of these plates 6a onto the shaft 5 like a whirl-stop, ten dovetail groove-shaped slots 6c are provided in a concave manner between the adjoining teeth 6b to extend in the axial and the circumferential directions on the outer periphery of the core 6.

On the other hand, the commutator 7 is constructed by disposing a plurality of commutator segments 7b, formed of conductive long plates parallel in the axial direction and arranged in the circumferential direction in a mutually isolated state on the outer circumferential surface of a ring-shaped member 7a externally fitted onto the shaft 5. Here, twenty commutator segments 7b, twice the number of the slots 6c, are provided, whereby the electric motor 1 is formed as an electric motor with four polesten slots 6c, and twenty commutator segments 7b. Also, at an end of each commutator segment 7b, facing the core 6 side, a riser 7c curved by folding back the same to the radially outer side is formed in an integrated manner.

By winding enamel-coated winding wires 9 between the slots 6c positioned at arbitrary points of the core 6 and provided with a predetermined interval according to a winding process described later, twenty coils 10 are wound around the outer periphery of the core 6. The winding wires 9 to be winding-start ends and winding-finish ends of the respective coils 10 have been passed around, that is, engaged with, the risers 7c of the respective corresponding commutator segments 7b, and the passed-around winding wires 9 to be winding-start ends and winding-finish ends have been set so that the commutator segments 7b and coils 10 corresponding thereto are electrically connected (are conductive) by fusing with the commutator segments 7b at the riser 7c sections (hung-around sections).

Next, a process for winding the coils 10 will be described with reference to FIGS. 2 to 5. Here, in a conventional electric motor in which the twenty commutator segments 7b of the armature 4, with half as many slots 6c as the commutator segments 7b being provided, when lap winding, that is normally generally used for the armature 4, is executed, the winding wire is wound between two slots with one slot therebetween. The pair of coils formed in such a manner respectively conducting an electric current to commutator segments adjoining at both side portions with reference to an arbitrary commutator segment are in the same state in terms of the winding direction. In contrast thereto, according to the invention, a pair of coils 10 formed so as to respectively conduct an electric current to commutator segments 7b adjoining at both side portions with reference to an arbitrary commutator segment 7b have been set so that one thereof is wound in a normal winding state, and the other, in a reverse winding state, in terms of the winding direction.

Figure 2:
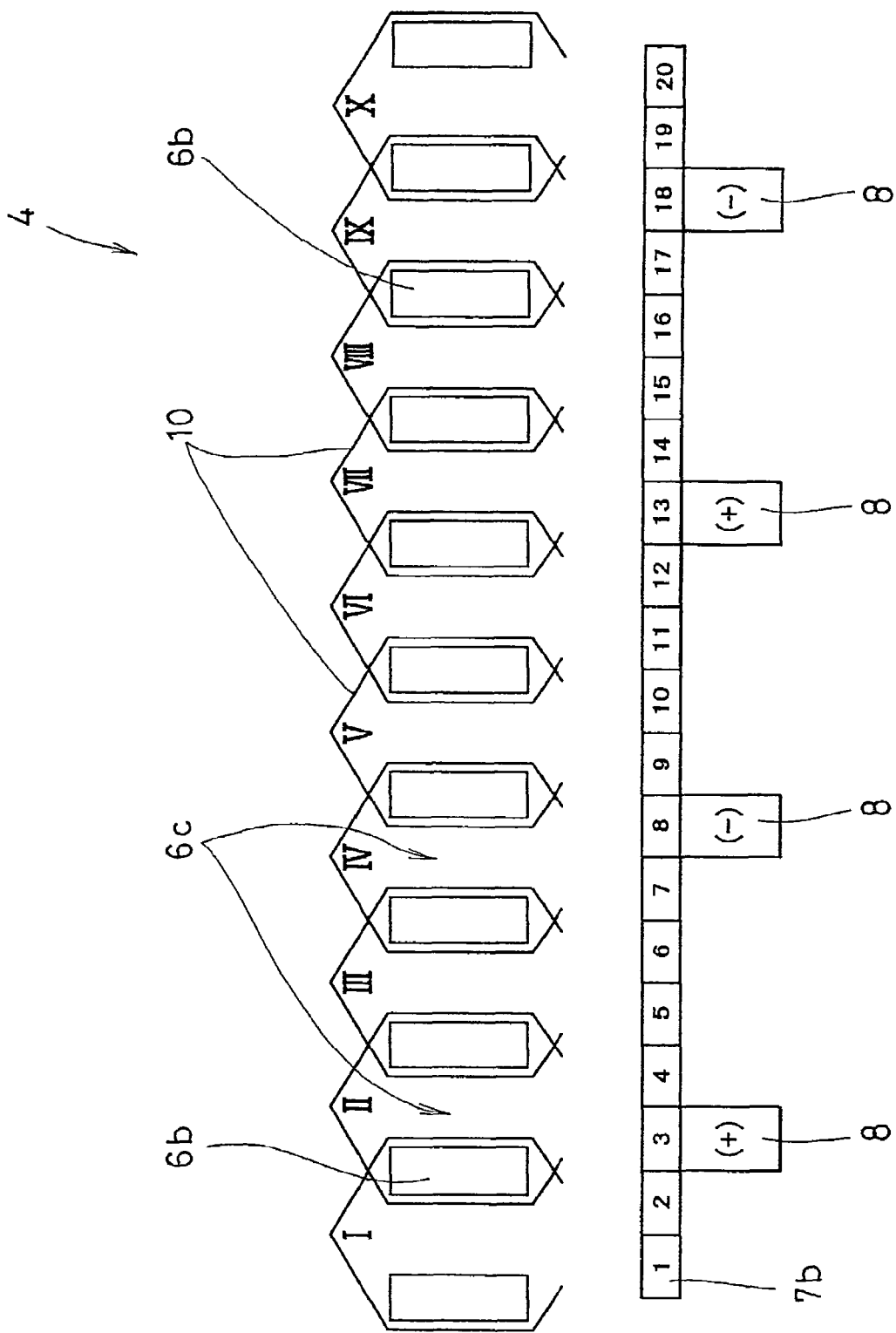
FIG. 2 is a pattern view where an armature has been developed.
Figure 3:
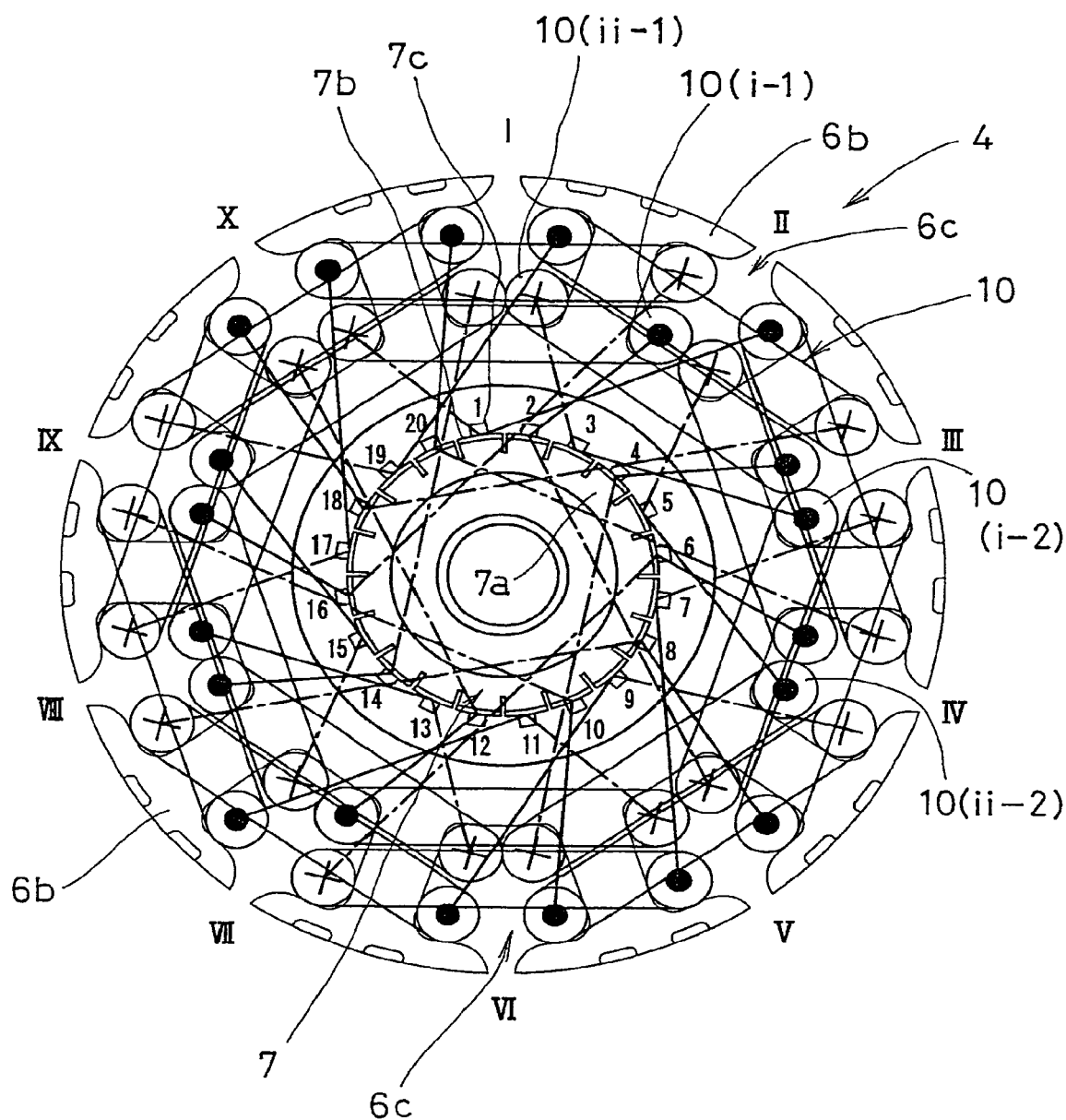
FIG. 3 is a cross-sectional view of an armature.
Figure 4:
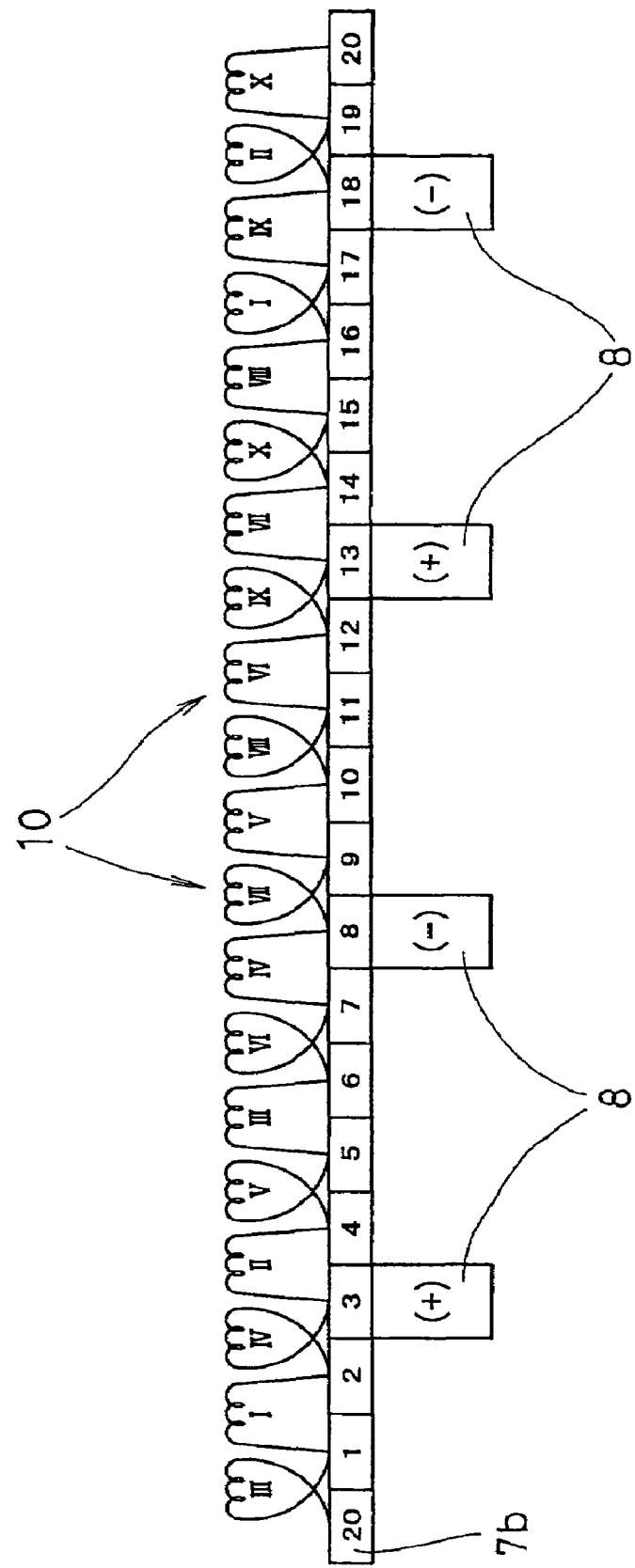
FIG. 4 is a development pattern explanatory view for a positional relationship between the coils and commutator segments.
Figure 5:
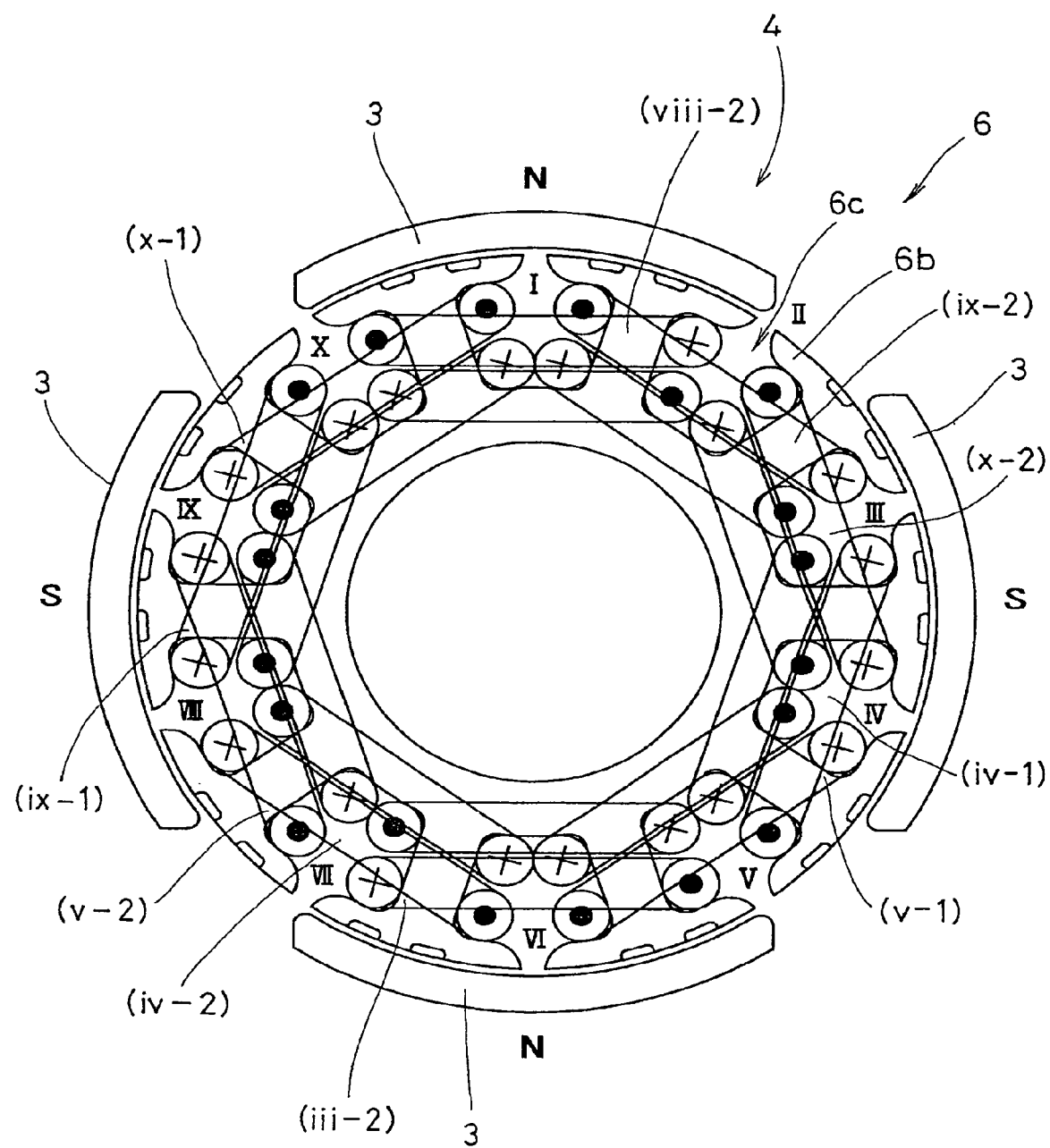
FIG. 5 is a cross-sectional view for a positional relationship between the slots and coils.

Also, FIG. 2 is a drawing in which the armature 4 has been linearly portrayed for explaining a relationship among the commentator segments 7b, slots 6c, and coils 10. The gaps with respect to the adjoining teeth 6b are equivalent to the slots 6c. Moreover, FIG. 3 is a cross-sectional view for explaining a process for winding the winding wires 9 around the armature 4, and winding directions of the winding wires 9 in cross-sections of the coils 10 formed as such are shown by marks ● and x. Furthermore, FIG. 4 is a pattern explanatory view, in which positions of the slots 6c that the winding wires 9 stride over are denoted by symbols in the coil 10, for explaining a positional relationship between the coil 10 positions and commutator segments 7b (risers 7c) that conduct an electric current to the coils 10. FIG. 5 is a cross-sectional view for explaining a positional relationship of the wound coils 10.

In these drawings, a description will be given with reference numerals 1 to 20 used for the respective risers 7c, reference numerals I to X used for the respective slots 6c, and reference numerals (i-1), (i-2), (ii-1), (ii-2), (iii-1), . . . , (x-1), and (x-2) used for the twenty wound coils wound, respectively.

Namely, the coils 10 to be wound around the armature 4 according to the embodiment are structured so that the winding wire 9 is wound between the slots 6c around teeth 6b, with one slot 6c therebetween. For example, when winding of one end of the winding wire 9 has started while conducting an electric current to the first riser, the winding wire 9 passed around the first riser 7c is wound into the Xth and IInd slots 6c with the Ist slot 6c therebetween a plurality of times (in the embodiment, twenty times), and by passing the same around the second riser 7c, an (i-1)th coil is formed. In this case, the (i-1)th coil 10 is in a winding direction (regarded as a normal winding state) where the winding wire 9 is passed around so as to reach from the Xth slot 6c side to the IInd slot 6c. Thereafter, by winding the winding wire 9 passed around the second riser 7c a plurality of times (in the present embodiment, twenty times) at a section with an angle of approximately 90 degrees in the circumferential direction with respect to the (i-1)th coil 10, namely around the IIIrd and the Vth slots 6c with the IVth slot 6c therebetween, and by passing the winding wire 9 around the third riser 7c, an (i-2)th coil 10 is formed. At this time, the (i-2)th coil 10 is wound so as to be in an opposite winding direction (referred to as a reverse winding state) from the (i-1)th coil 10 as a result that the winding wire 9 is passed around so as to reach from the Vth slot 6c side to the IIIrd slot 6c, whereby the (i-1)th coil 10 and (i-2)th coil 10 are set so that, when one faces the N-pole permanent magnet 3 of the yoke 2, the other faces the S pole, and when a power is supplied to these coils 10, an excitation corresponding to the respective poles occurs.

Subsequently, although the (ii-1)th coil 10 is formed by winding the winding wire 9 passed around the third riser 7c between the Ist to IIIrd with the IInd slot 6c therebetween and passing the same around the fourth riser 7c, the (ii-1) coil 10 is wound in a normal winding state as a result the winding wire 9 is passed around so as to reach from the Ist slot 6c side to the IIIrd slot 6c. Furthermore, by winding the winding wire 9 passed around the fourth riser 7c at a section with an angle of approximately 90 degrees in the circumferential direction with respect to the (ii-1)th coil 10, namely around the IVth and VIth slots 6c with the Vth slot 6c therebetween and passing the same around the fifth riser 7c, a (ii-2)th coil 10 is formed. At this time, the (ii-2)th coil 10 is wound in a reverse winding state opposite from the (ii-1)th coil 10 as a result that the winding wire 9 is passed around so as to reach from the VIth slot 6c side to the IVth slot 6c.

As such, the winding wire 9 is set so as to be wound around the slots 6c in a manner sequentially passed around the sixth, seventh, and eighth risers 7c . . . based on the winding states, and in this case, as mentioned above, to the commutator segments 7b adjoining at both sides in the circumferential direction with reference to an arbitrary commutator segment 7b (riser 7c), a pair of coils 10 has been respectively connected so as to conduct an electric current, and the pair of coils 10 have been set so as to be wound in a positional relationship provided with a circumferential angle of approximately 90 degrees so as to be caused, in the yoke 2 constructed with four poles, to face the poles opposite from each other, and so that one ((i-1) to (x-1)th) of the coils 10 is wound in a normal winding state and the other ((i-2) to (x-2)th) of the coils 10 is wound in a reverse winding state.

Thereby, as shown in FIG. 5, around the slots 6c at an arbitrary point with one slot 6c therebetween, a pair of coils 10 are to be respectively wound, and in this case, it has been set so that a pair of coils 10 in a normal winding state and a reverse winding state are wound around the slots 6c.

Therein, when a power is supplied to the coils as a result of the brushes 8 slidable contact with the commutator 7, the (i-1)th coil 10 and (i-2)th coil 10 formed in a manner to respectively conduct an electric current to the first riser 7c and third riser 7c adjoining at both sides in the circumferential direction with reference to the second riser 7c (commutator segment 7b), for example, are wound with an angle of approximately 90 degrees in the circumferential direction so as to face the poles opposite from each other. The (i-1)th coil 10 is wound in a normal winding state, and the (i-2)th coil 10, in a reverse winding state, whereby a pair of coils 10 of the (i-1)th coil 10 and a (viii-2)th coil 10 are wound around the slots 6c with the Ist slot 6c therebetween. As a result, the coils 10 connected between the brushes 8 of opposite poles are faced between the adjoining N and S poles to balance magnetism therebetween, thus improving magnetic balance all round the outer periphery of the armature 4.

In the embodiment structured as described, as mentioned above, the yoke 2 is constructed with four poles. On the other hand, when the winding wire 9 is wound around the armature 4, there are twenty commutator segments 7b provided on the armature 4, ten slots 6c are formed on the outer periphery of the core 6c, and a pair of coils 10 that respectively conduct an electric current to the commutator segments 7b adjoining at both sides in the circumferential direction with reference to an arbitrary commutator segment 7b are caused to face the poles opposite from each other. One coil 10 of the pair is wound as a normal winding coil 10, and the other, as a reverse winding coil 10. Thereby, the coils 10 connected between the brushes 8 of opposite poles are brought into corresponding excitation states in a manner facing the adjoining N and S poles, respectively, which can improve magnetic balance. As a result, whirling based on a torque ripple and the like is reduced to provide a low-vibration low-noise rotary electric machine with an excellent performance.

Further, the slots 6c on the outer periphery of the core 6 have been reduced to half the number of the commutator segments 7b. When winding the winding wire 9 between the respective slots 6c, because the facing distance between the slots 6c is reduced, the amount of the winding wire 9 (coil amount) is correspondingly reduced, copper use is reduced, and moreover, the weight is lowered thereby contributing to a reduction in size and weight. As a result, a reduction in cost is realized and, as a matter of course, commutation performance is improved. Moreover, because the respective coils 10 are wound in a so-called one-slot stride with one slot 6c therebetween, this structure also realizes not only the reduction in copper use, the reduction in size and weight, and the reduction in cost as mentioned above, but also achieves high efficiency and the improvement in commutation performance.

Further, the coils 10 can be wound using a double flyer in a manner starting to wind the winding wire 9 from two points of the first commutator segment 7b and eleventh commutator segment 7b, thus a further reduction in cost can be realized.

Figure 6:
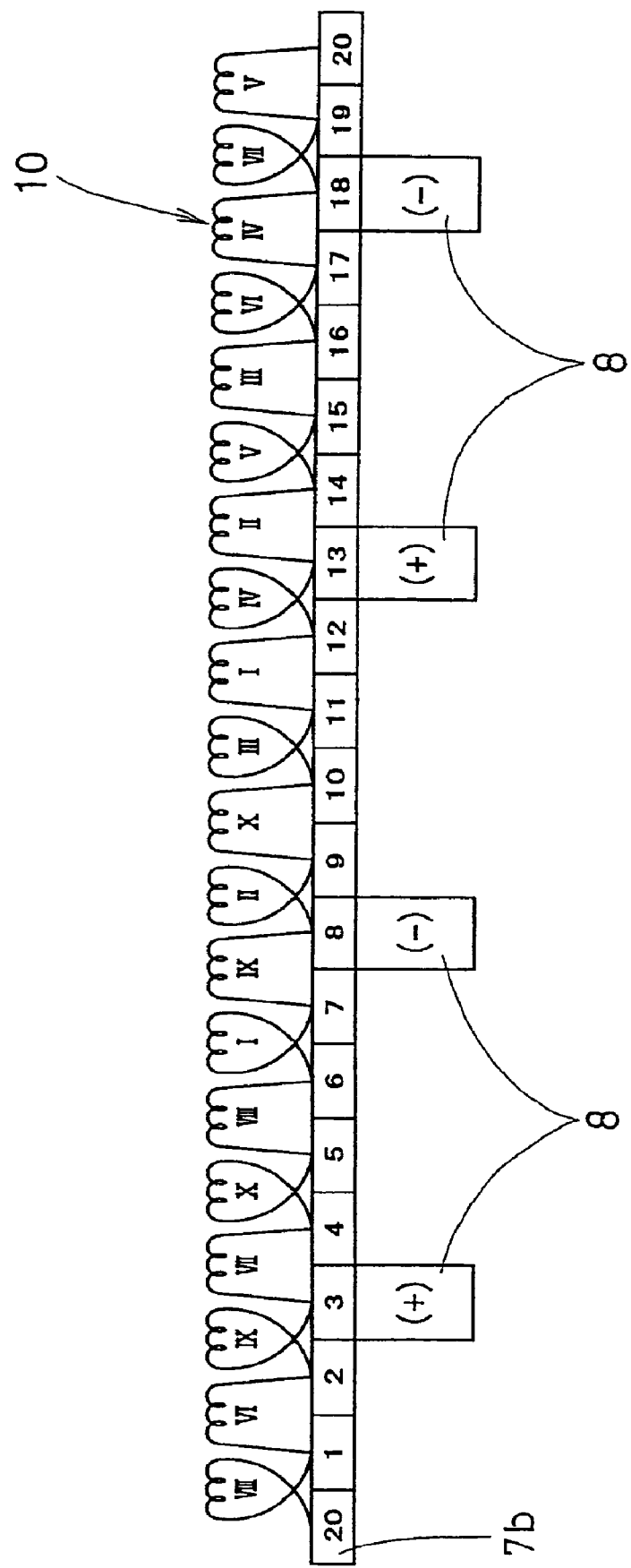
FIG. 6 is a development pattern explanatory view for a positional relationship between the coils and commutator segments according to a second embodiment.
Figure 7:
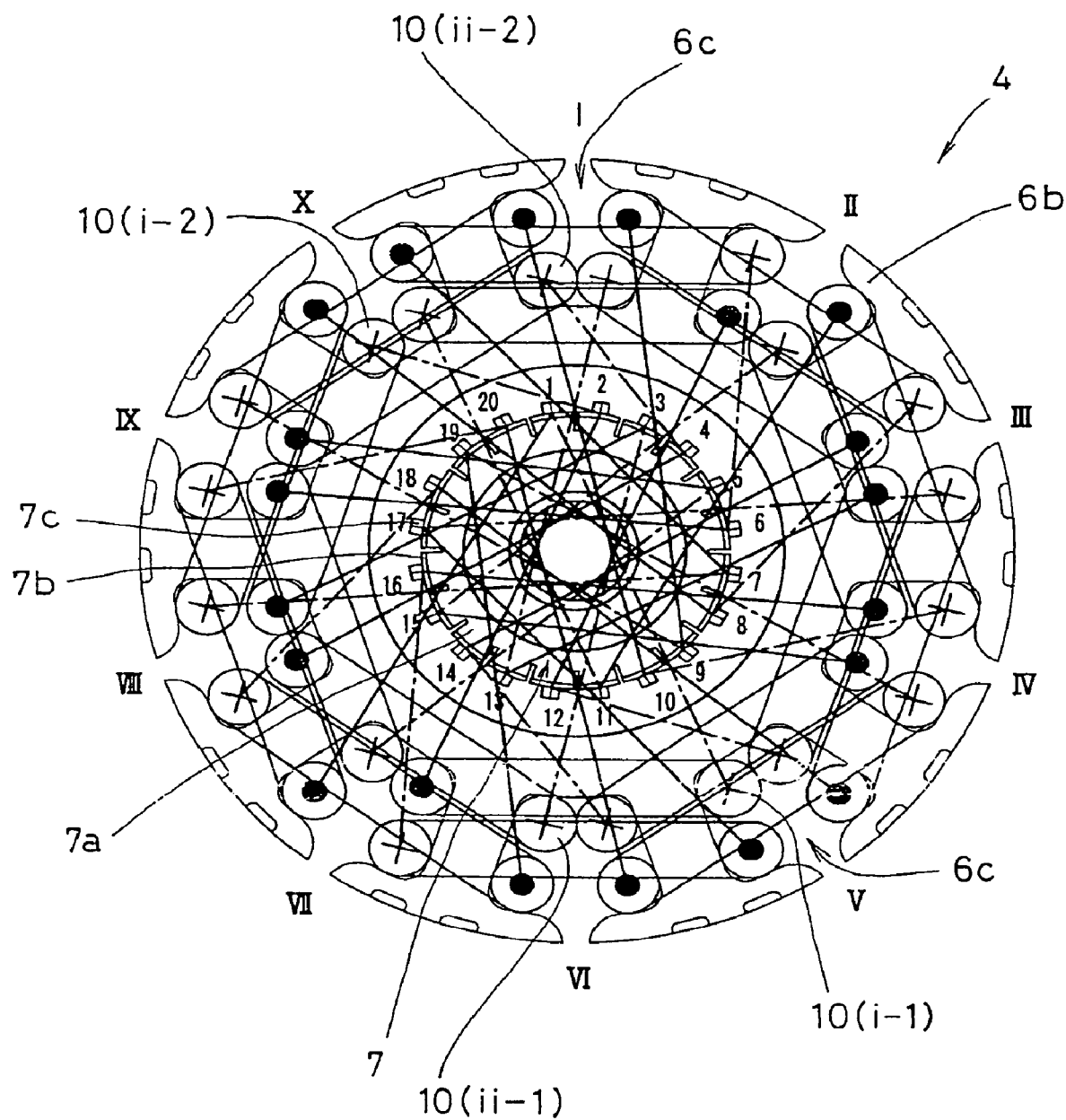
FIG. 7 is a cross-sectional view of an armature according to the second embodiment.
Figure 8:
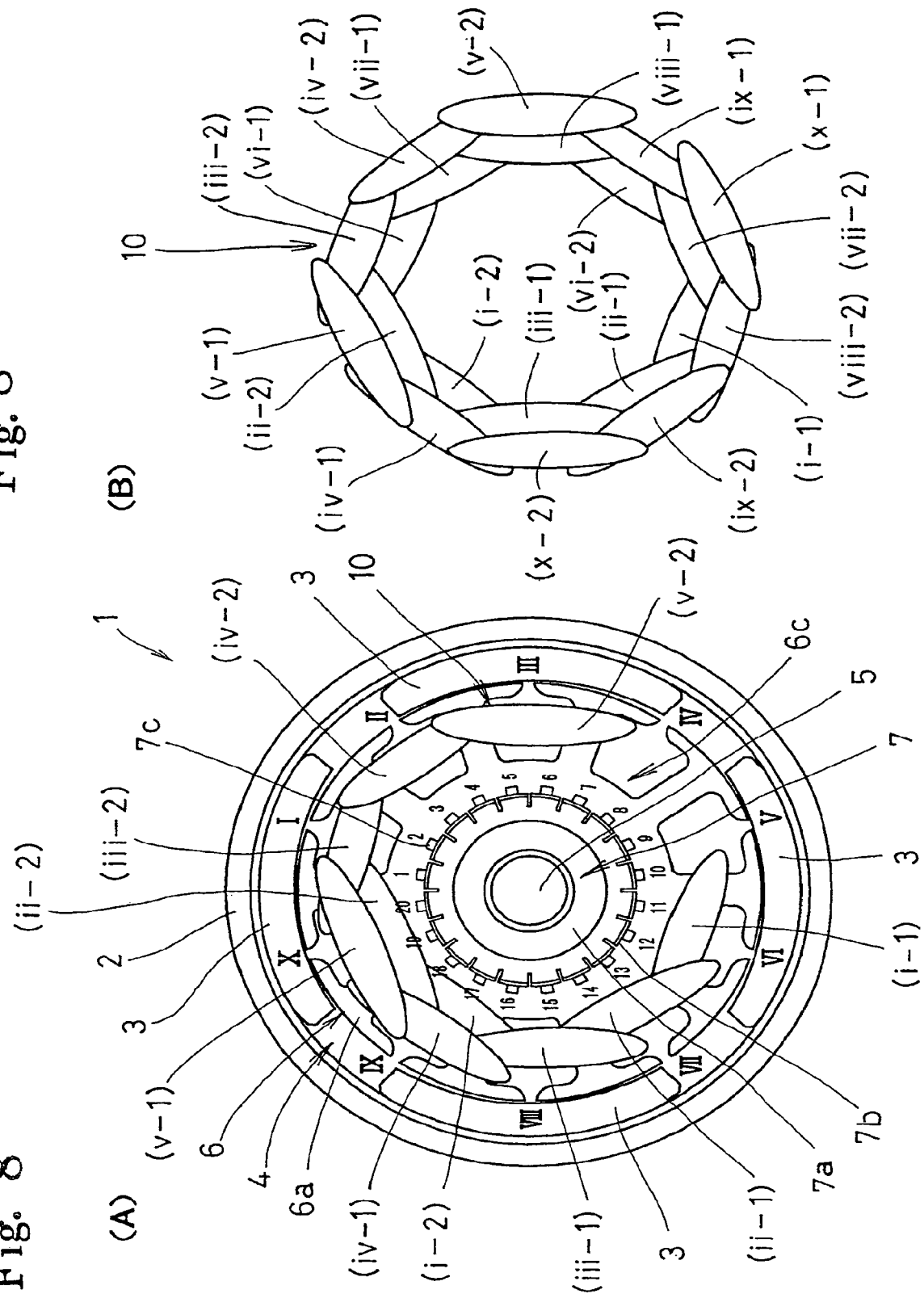
FIGS. 8(A) and (B) are a cross-sectional view of an armature in a state where one of the winding wires has been wound and a cross-sectional view of an armature in a state where both wiring wires have been wound in the second embodiment, respectively.

Here, as a matter of course, the disclosure is not limited to the embodiment described above, and can be formed as in a second embodiment shown in FIGS. 6 to 8.

The electric motor 1 according to the second embodiment is the same as that of the first embodiment in that it is formed as an electric motor with four poles, ten slots 6c, and twenty commutator segments 7b, and a pair of coils 10, that respectively conduct an electric current to the commutator segments 7b (riser 7c) adjoining at both sides in the circumferential direction with respect to an arbitrary commutator segment 7b, face the poles opposite from each other. One coil 10 of the pair is wound as a normal winding, and the other, as a reverse winding. This structure is the same as the first embodiment mentioned above. In the second embodiment one of the coils 10 (wound in a normal winding state) is positioned at an opposite side in the radial direction of the commutator segment 7b connected so as to be conductive, and the other coil 10 (wound in a reverse winding state) is wound around in an opposite direction from the direction in which the commutator segment 7b is wound along and is wound at a position with a predetermined angle clockwise with respect to the one coil 10.

Namely, an (i-1)th coil 10 is formed by passing or connecting one end of the winding wire 9 around the first riser 7c and winding the winding wire 9 around the Vth and VIIth slots 6c with the VIth slot 6c therebetween a plurality of times (in the present embodiment, twenty times) and passing the winding wire 9 around the second riser 7c. In this case, the (i-1)th coil 10 is wound so as to be in a normal winding state as a result that the winding wire 9 has been coiled from the Vth slot 6c side to the VIIth slot 6c. Thereafter, by winding the winding wire 9 passed around the second riser 7c, at a section with an angle of approximately 90 degrees in the circumferential direction with respect to the (i-1)th coil 10, namely around the Xth slot side and the VIIIth slot 6c with the IXth slot 6c therebetween a plurality of times (in the present embodiment, twenty times), and passing the winding wire 9 around a third riser 7c, an (i-2)th coil 10 in a reverse winding state is formed.

Subsequently, a (ii-1)th coil 10 is formed by winding the winding wire 9 passed around the third riser 7c at a section from the VIth slot 6c to the VIIIth slot 6c with the VIIth slot 6c therebetween and passing the same around a fourth riser 7c. Then, by winding the winding wire 9 passed around the fourth riser 7c, at a section with an angle of approximately 90 degrees in the circumferential direction with respect to the (ii-1)th coil 10, namely around the Ist slot 6c and the IXth slots 6c with the Xth slot 6c therebetween and passing the same around the fifth riser 7c, a (ii-2)th coil 10 in a reverse winding state is formed.

As such, by winding the winding wire 9 around the slots 6c in a manner sequentially passed around the sixth, seventh, and eighth risers 7c . . . based on the winding states, coils 10 are wound around the outer periphery of the armature 4 in an integrated manner. And, therein as well, similar to the first embodiment, magnetic balance can be improved, and whirling based on a torque ripple and the like is reduced, thus providing a rotary electric machine with an excellent performance as a result of the reduction in vibration and noise. Further, the coils 10 are formed by the winding wire 9 around the commutator segments 7b with the slots 6c facing in the radial direction therebetween. Therefore, interference of the winding wire 9 with other winding wire 9 can be reduced to prevent winding expansion, and a space factor of the winding wire 9 in the slots 6c can be improved.

Also, for both armatures 4, according to the first and second embodiments, it is also possible to carry out winding from the first and eleventh commutator segments 7b as the start of winding by use of a double flyer. This allows improved productivity. Here, FIGS. 8(A) and 8(B) show cross-sectional views for explaining the case of winding using the double flyer in terms of the second embodiment, where FIG. 8(A) is a cross-sectional view in a state where only one of the winding wires 9 has been wound, and FIG. 8(B) is a cross-sectional view in a state where both winding wires 9 have been wound.

Figure 9:
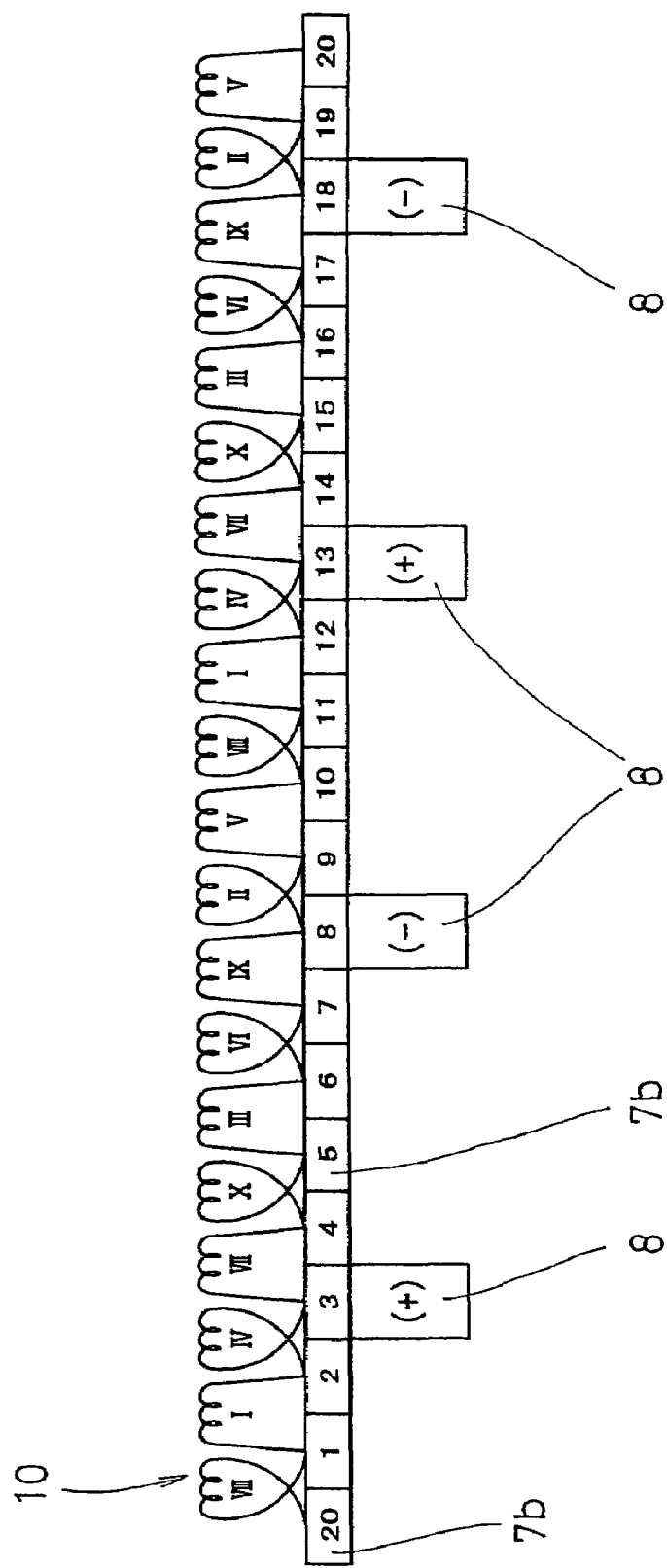
FIG. 9 is a development pattern explanatory view for a positional relationship between the coils and commutator segments according to a third embodiment.

Next, a third embodiment, shown in FIG. 9, will be described.

The electric motor 1 according to the third embodiment is the same as that of the previous embodiments in that the third embodiment is formed as an electric motor with four poles, ten slots 6c, and twenty commutator segments 7c. Four ((2n/N)−1)) coils formed in a manner respectively conducting an electric current to arbitrary five ((2n/N)) commutator segments 7b adjoining in the circumferential direction are structured as ones each of which has an angle of approximately 90 degrees ((360/N)) and for which a coil 10 in a normal winding state and a coil 10 in a reverse winding state are alternately wound.

Namely, this embodiment is structured so that, in such a manner that an (i-1)th coil 10, conducting an electric current to the first and second commutator segments 7b, is wound in a normal winding state around the IInd and Xth slots 6c with the Ist slot 6c therebetween, an (i-2)th coil 10, conducting an electric current to the second and third commutator segments 7b, is wound in a reverse winding state around the Vth and IIIrd slots 6c with the IVth slot 6c therebetween, an (ii-1)th coil 10, conducting an electric current to the third and fourth commutator segments 7b, is wound in a normal winding state around the VIth and VIIIth slots 6c with the VIIth slot 6c therebetween, and an (ii-2)th coil 10, conducting an electric current to the fourth and fifth commutator segments 7b, is wound in a reverse winding state around the Ist and IXth slots 6c with the Xth slot 6c therebetween, the coils 10 are sequentially wound while skipping over three slots 6c. The coils 10 are wound with a predetermined gap between the adjoining coils 10, i.e., an angle of approximately (360/N) degrees, that is, approximately (360×3/10) degrees and are wound in the sequential winding direction alternating a normal winding state with a reverse winding state. Thereby, the coils 10 connected between the brushes 8 of opposite poles are set so as to face the respective four poles provided on the inner circumference of the yoke 2 in corresponding winding directions. Consequentially, therein, magnetic balance entirely in the circumferential direction of the armature 4 is unified, and whirling based on a torque ripple and the like is reduced, thus providing a rotary electric machine with an excellent performance as a result of a reduction in vibration and noise.

Figure 10:
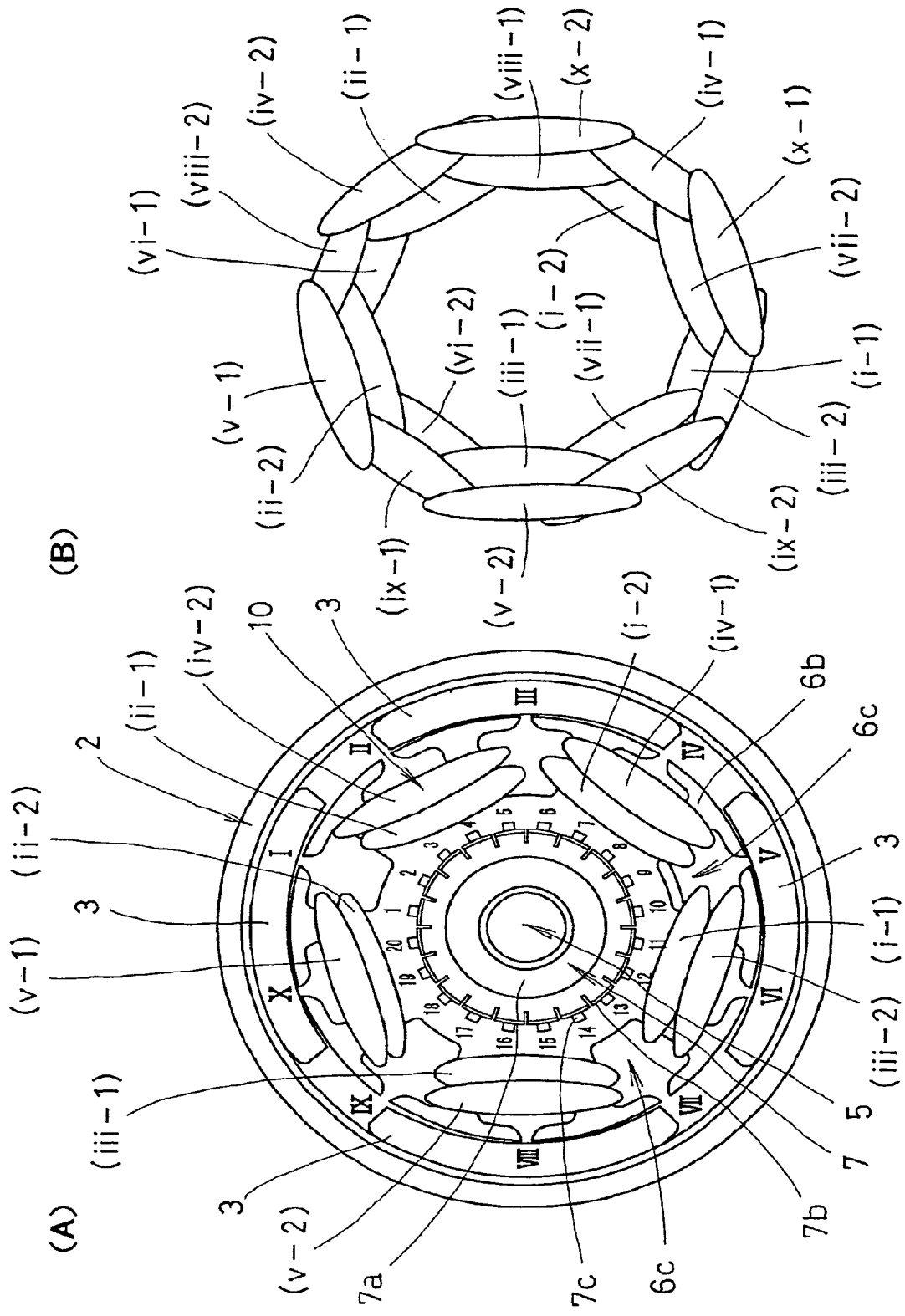
FIGS. 10(A) and (B) are a cross-sectional view of an armature in a state where one of the winding wires has been wound and a cross-sectional view of an armature in a state where both wiring wires have been wound according to a fourth embodiment, respectively.
Figure 11:
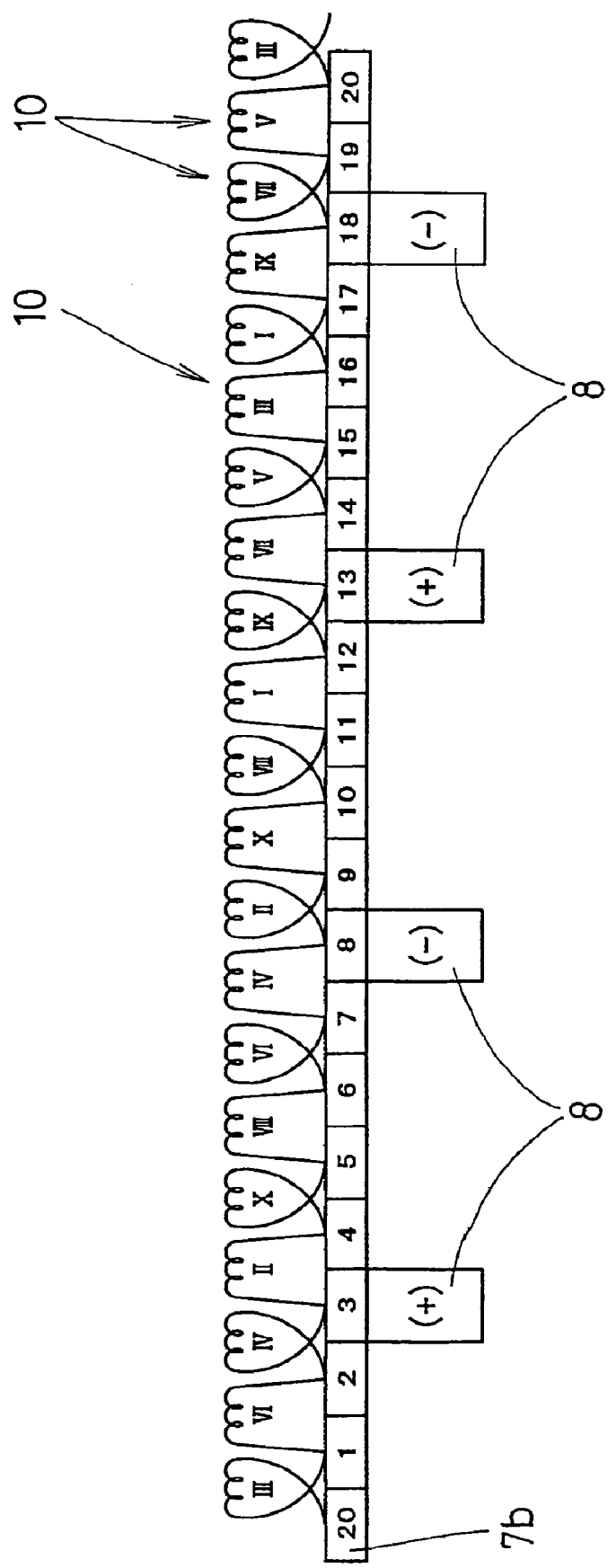
FIG. 11 is a development pattern explanatory view for a positional relationship between the coils and commutator segments according to the fourth embodiment.

Moreover, it is also possible to form an electric motor as in a fourth embodiment shown in FIGS. 10(A), 10(B), and 11.

This embodiment is also the same as that of the previous embodiments in that it is formed as an electric motor 1 with four poles, ten slots 6c, and twenty commutator segments 7c. In this fourth embodiment, coils 10 are wound by use of a double flyer. For the respective coils 10, from the first commutator segment 7b and eleventh commutator segment 7b as the start of winding, an (i-1)th coil 10 and an (vi-1)th coil 10 are respectively wound around, by starting from the first commutator segment 7b and eleventh commutator segment 7b, in a normal winding state between the VIIth and Vth slots 6c and between the IInd and Xth slots 6c skipping over the VIth and Ist slots 6c, respectively, facing in the radial direction. In contrast thereto, for an (i-2)th coil 10 and a (vi-2)th coil 10 subsequently formed, in a manner proceeding in an opposite direction from the direction in which the commutator segment 7b is wound along, respectively, the (i-2)th coil 10 and the (vi-2)th coil 10 are formed in a reverse winding state around the IIIrd and Vth slots 6c and around the Xth and VIIIth slots 6c skipping over the IVth and IXth slots 6c, respectively, provided with an angle of approximately (360/N) degrees, that is, (360×2/10) degrees relative to the VIth and Ist slots 6c. As such, therein, the coils 10 connected to the adjoining commutator segments 7b are wound with a predetermined gap of ((360×2/10) degrees, that is, approximately (360/N) degrees) from each other, and in a manner alternating the winding directions. Thus, the direction in which the winding wire 9 winds around the commutator segment 9 and the direction in which the coils 10 are wound are opposite. Accordingly, in the fourth embodiment, similar to the third embodiment, the coils 10 connected between the brushes 8 of opposite poles face the respective four poles on the inner circumference of the yoke 2 in corresponding winding directions. Therefore, magnetic balance entirely in the circumferential direction of the armature 4 is unified, and whirling based on a torque ripple and the like is reduced, thus providing a rotary electric machine with an excellent performance as a result of a reduction in vibration and noise. Further, in the fourth embodiment, the coils 10 are formed by winding the winding wire 9 around the commutator segments 7b with the slots 6c facing in the radial direction therebetween at the start of winding. Therefore, the winding wire 9 is tightly wound around the shaft 5, and a space factor of the winding wire 9 in the slots 6c can be improved.

Figure 12:
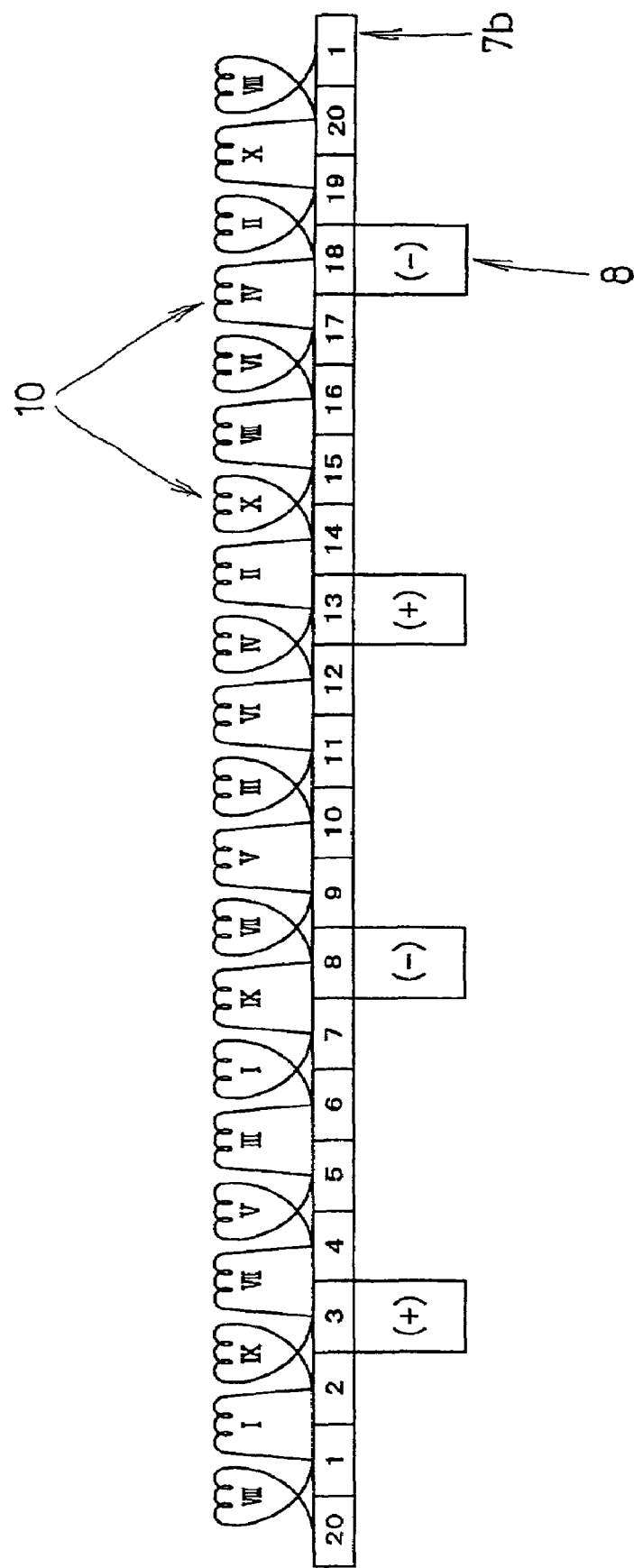
FIG. 12 is a development pattern explanatory view for a positional relationship between the coils and commutator segments according to a fifth embodiment.

A fifth embodiment, shown in FIG. 12, will now be described. The fifth embodiment is almost the same in structure as the fourth embodiment. The electric motor 1 is formed as an electric motor with four poles, ten slots 6c, and twenty commutator segments 7b. The coils 10 are wound by use of a double flyer, which is almost the same as in the fourth embodiment. For the respective coils 10, from the first commutator segment 7b and eleventh commutator segment 7b as the start of winding, an (i-1)th coil 10 and an (vi-1)th coil 10 are wound, in a normal winding state, between the IInd and Xth slots 6c and between the VIIth and Vth slots 6c, skipping over the Ist and VIth slots 6c, respectively, facing in the axial direction with respect to the first commutator segment 7b and eleventh commutator segment 7b. Then an (i-2)th coil 10 and a (vi-2)th coil 10 are formed by moving the winding position in an opposite direction to the previous direction in which the commutator segments 7b are wound. That is, the (i-2)th coil 10 and the (vi-2)th coil 10 are formed, in a reverse winding state, between the VIIIth and Xth slots 6c and between the IIIrd and Vth slots 6c skipping over the IXth and IVth slots 6c, respectively, provided with an angle of approximately (360/N) degrees, that is, (360×2/10) degrees relative to the Ist and VIth slots 6c. As such, in the fifth embodiment, the coils 10 connected to the adjoining commutator segments 7b are wound with a predetermined gap (of (360×2/10) degrees, that is, approximately (360/N) degrees) from each other, and in a manner alternating the winding directions. Moreover, the coils 10 are wound so that the direction in which the winding wire 9 winds around the commutator segment 7b and the direction in which the coils 10 are wound are opposite. Accordingly, in the fifth embodiment, similar to the third and fourth embodiments, the coils 10 connected between the brushes 8 of opposite poles face the respective four poles on the inner circumference of the yoke 2 in corresponding winding directions, therefore, magnetic balance in the circumferential direction of the armature 4 is unified, and whirling based on a torque ripple and the like is reduced, thus providing a low-vibration, low-noise rotary electric machine with an excellent performance.

Furthermore, in addition to the previously described embodiments, when, for example, as the electric motor, one with four poles (N=4), ten (n=10) slots, and twenty (2n=20) commutator segments is used, it is also possible to provide four ((2n/N)−1) coils that respectively conduct an electric current to the adjoining five (2n/n) commutator segments as ones wound so as to face all poles (all four poles), respectively, and in this case a further improvement in magnetic balance can be expected.

Moreover, in an electric motor whose number of magnetic poles is six or eight, it is also possible to employ a structure to cause coils conducting an electric current to adjoining commutator segments to face adjoining opposite poles as well as a construction to cause coils to face opposite poles with a pair of magnetic poles therebetween.

Moreover, it is also possible to wind a pair of coils that respectively conduct an electric current to adjoining commutator segments so as to cause the same to face the same poles fixedly fitted at positions different from each other. Thus, as the electric motor, when, for example, one with four poles (N=4), ten (n=10) slots, and twenty (2n=20) is used, a pair of coils to be wound around adjoining three commutator segments have an angle of approximately 180 (360×2/N) degrees so as to face poles of the same polarity with respect each other, and are wound in the same winding direction, allows provision of a rotary electric machine excellent in magnetic balance.

Figure 13:
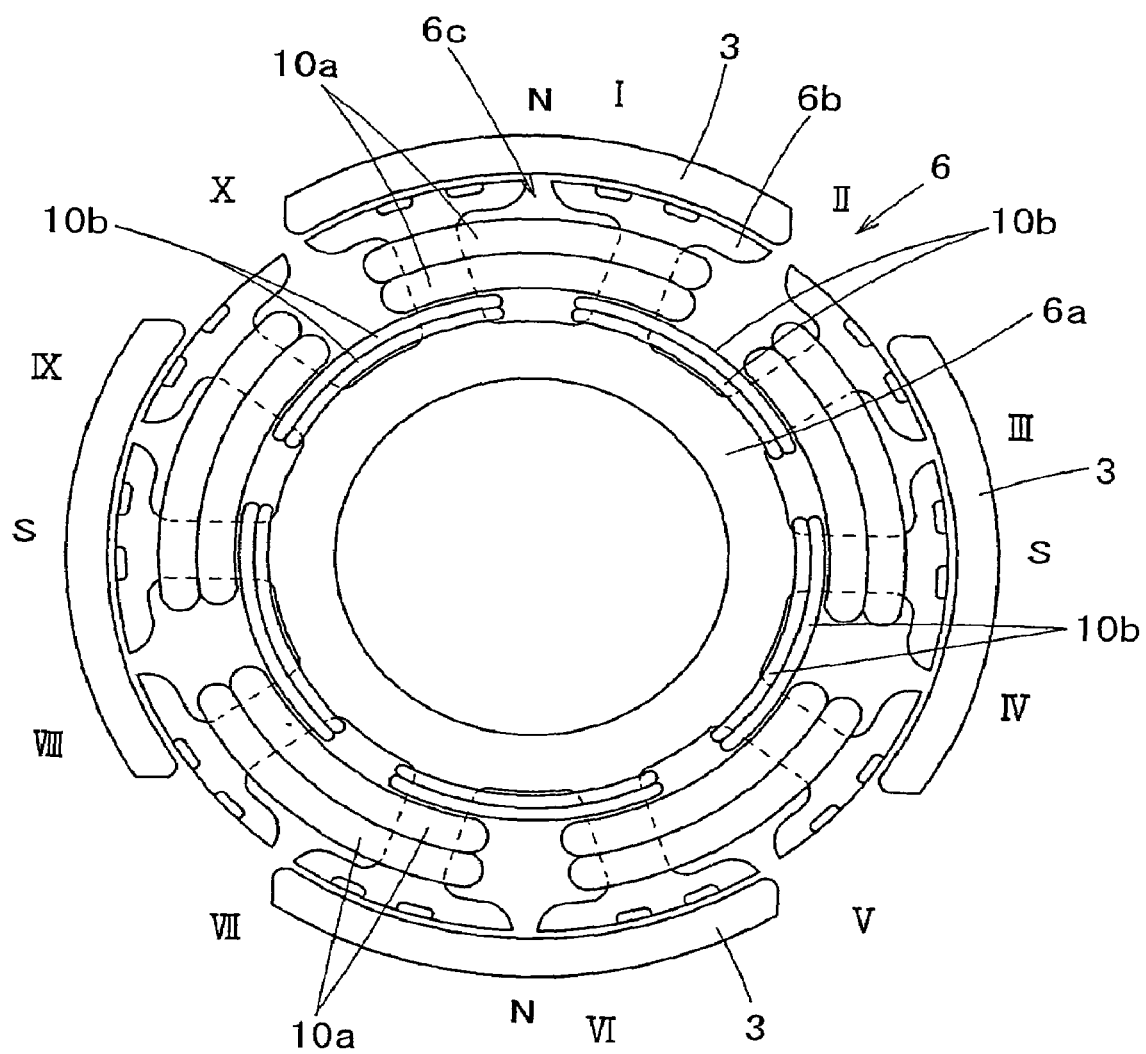
FIG. 13 is a cross-sectional view of an armature showing a wound state of coils according to a sixth embodiment.

A sixth embodiment, shown in FIG. 13, will be described next. The electric motor 1 according to the sixth embodiment is the same as that of the previous embodiments in that it is formed as an electric motor with four poles, ten slots 6c, and twenty commutator segments 7b. Furthermore, the core (armature core) 6 therein is the same in structure as the first and second embodiments. Two layers of ten coils each, a total of twenty coils 10 are wound around the outer periphery of the core 6. In this sixth embodiment, of these coils 10, with reference to an arbitrary slot 6c (for example, the Ist slot in FIG. 13), where a pair of coils 10 wound with the arbitrary (Ist) slot 6c therebetween are respectively provided as first coils 10a and a pair of coils 10 wound with (IInd or Xth) slot 6c adjoining the arbitrary (Ist) slot 6c therebetween are respectively provided as second coils 10b, these first and second coils 10a, 10b are wound so as to be different in the number of windings of the winding wire 9 from each other. Namely, in the present embodiment, the coils are wound so that a ratio of the number of windings between the first coils 10a and second coils 10b is 3:1, respectively. Here, the twenty coils 10 are wound so that, as mentioned above, the coils 10, connected between the brushes 8 of opposite poles, face at least a pair of adjoining magnetic poles in corresponding winding directions, respectively. Therefore, magnetic balance entirely in the circumferential direction of the armature 4 is unified, and whirling based on a torque ripple and the like is reduced, thus providing a low-vibration, low-noise electric motor with excellent performance.

In the electric motor where the first and second coils 10a, 10b have been wound based on a predetermined ratio of the number of windings, commutation is improved so that the life (durability) of the brushes can be enhanced, and noise can be reduced. Thus, an electric motor with a higher performance can be provided.

Furthermore, in the present embodiment, the coils are wound in a mutually biased state, so that the pair of first coils 10a with a greater number of windings is located at the outer radial side, while the pair of second coils 10b with a smaller number of windings is located at the inner radial side. Thereby, in the slots 6c, where the groove width in the circumferential direction becomes greater toward the outer radial side, by reducing the number of windings toward the inner radial side and increasing the windings at the outer radial side by that much, it becomes possible to improve the space factor of the slots 6c. Thus, it becomes possible to realize a reduction in the radial size of the slots 6c and a reduction in size and weight of the electric motor 1.

Figure 14:
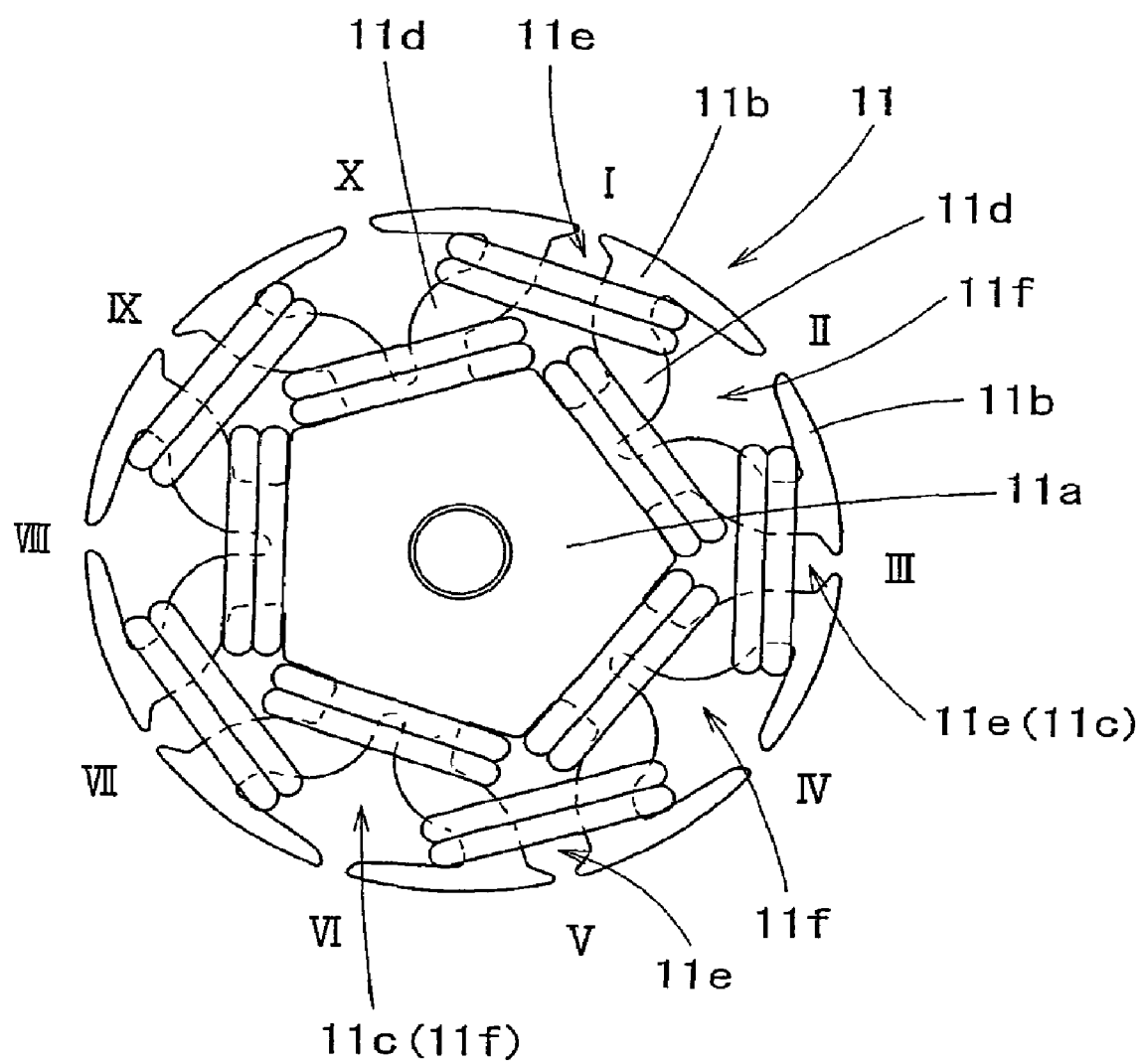
FIG. 14 is a cross-sectional view of an armature showing a wound state of coils according to a seventh embodiment.

Subsequently, a seventh embodiment, shown in FIG. 14, will be described. The electric motor 1 according to the seventh embodiment is the same as that of the previously described embodiments in that this is formed as an electric motor with four poles, ten slots 6c, and twenty commutator segments 7b. Furthermore, for a core 11, teeth 11b are formed on the outer periphery of a ring-shaped plate 11a, which is the same as the core 6 in the respective embodiments. The plate 11a has a feature in the shapes of base parts 11d, that are components of the teeth 11b, extend in the radial direction, so that the shapes of slots 11c formed between the teeth 11 have different forms.

Namely, the base parts 11d are each formed in a shape that is bent to one side or the other in the circumferential direction. Therefore, for the slot 11c formed between a pair of base parts 11d (teeth 11b), with reference to an arbitrary slot 11c (for example, Ist slot 11c in FIG. 14), the arbitrary slot (Ist slot) 11c is formed as a first slot 11e in a shape with a small groove width at the outer radial side and a great groove width at the inner radial side, and a (IInd or Xth) slot 11c adjoining the arbitrary (Ist) slot 11c is formed as a second slot 11f in a shape with a small groove width at the inner radial side and a great groove width at the outer radial side which is reverse to the first slot 11e.

And, therein, when winding two layers of ten each, a total of twenty coils 10 by winding the winding wire 9 around the slots 11c, with reference to the above-described arbitrary slot 11c (Ist slot 11c), where a pair of coils 10 wound with the arbitrary (Ist) slot 11c therebetween are respectively provided as first coils 10a and a pair of coils wound with a IInd or Xth slot 11c (second slot 11f) adjoining the same therebetween are respectively provided as second coils 10b. The pair of first coils 10a are wound at the outer radial side with a small groove width, and the pair of second coils 10b, at the inner radial side with a small groove width, in a biased state, respectively, so that the winding amount of the winding wire 9 is reduced. In addition, when winding the first and second coils 10a, 10b as such, the point where the winding wire 9 is wound is to be secured as a large space in the slots 11c to make it possible to improve the space factor of the winding wire 9, which can contribute to a reduction in size of the electric motor. Moreover, in the electric motor by winding as such, not only can an overlapping part between the coils 10 be reduced in comparison with that of conventional electric motor by lap winding, but also a crossover being the winding wire 9 between arbitrary coils 10 can be shortened. Consequently, the amount of the winding wire 9 can be reduced to make it possible to reduce the weight. Furthermore, because the amount of the winding wire 9 is reduced, copper use is reduced, and high efficiency of the electric motor can also be realized.

Figure 15:
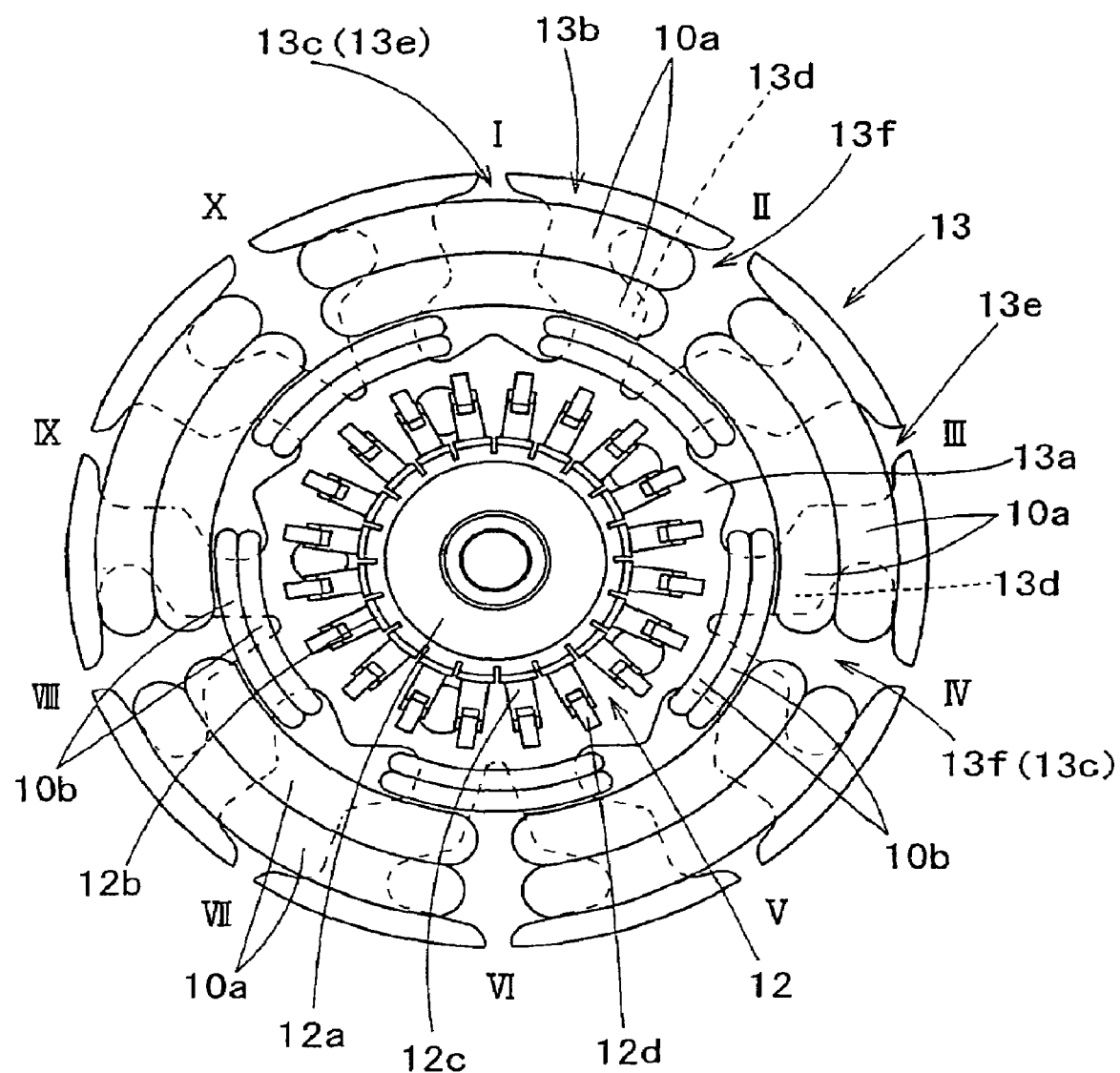
FIG. 15 is a cross-sectional view of an armature showing a wound state of coils according to an eighth embodiment.
Figure 16:
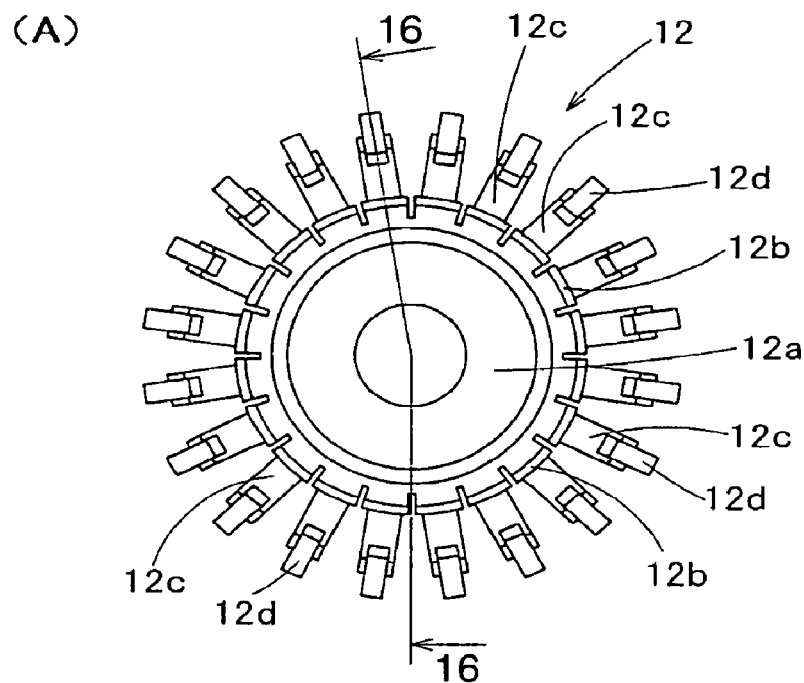
FIGS. 16(A) and (B) are a front view of a commutator and a cross-sectional view along 16-16 of FIG. 16(A) according to the eighth embodiment, respectively.
Figure 16:
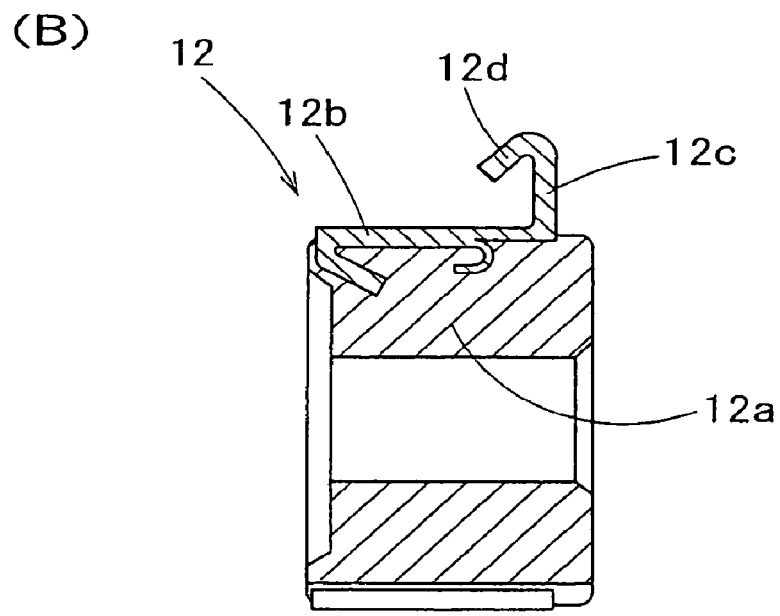

Furthermore, an eighth embodiment is shown in FIGS. 15, 16(A), and 16(B). The electric motor 1 according to the eighth embodiment is the same as that of the previous embodiments in that it is formed as an electric motor with four poles, ten slots 6c, and twenty commutator segments 7b. Further in the commutator 12 of the eight embodiment, twenty commutator segments 12b are provided on the outer peripheral surface of a resin-made (insulation) ring-shaped body 12a in an integrated manner. The respective commutator segments 12b, have risers 12 protruding therefrom to the outer radial side that are formed in an integrated manner. The protruded front ends of the risers 12c are formed at a side to extend away from the core 13 and formed into latching segments 12d that are folded back toward the inner radial side. As a result, the winding wire 9 can be easily wound around the latching segments 12d to connect the coils 10. Furthermore, for the core 13, in the same manner as the seventh embodiment, a plurality of teeth 13b with base parts 13d having different forms are formed on the outer periphery of a ring-shaped part 13a. Slots 13c, having groove shapes of different forms, are formed between the teeth 13b. The slots 13c adjoining in the circumferential direction are formed wherein a first slot 13e, with a wide groove width at the inner radial side and a second slot 13f, with a wide groove width at the outer radial side, are formed alternately in the circumferential direction.

When winding two layers of ten coils 10 each, for a total of twenty coils 10 on the outer periphery of the core 6, by winding the winding wire 9 around the slots 13c, with reference to an arbitrary slot 13c (Ist slot 13c which is a first slot 13e), where a pair of coils 10 wound with the Ist slot 13c therebetween are respectively provided as first coils 10a and a pair of coils 10 wound with a IInd or Xth slot 13c (second slot 13f) adjoining the same therebetween are respectively provided as second coils 10b. By winding the pair of first coils 10a at the outer radial side with a small groove width, and the pair of second coils 10b, at the inner radial side with a small groove width, the coils 10 are wound so that the winding amount of the winding wire 9 is reduced. Further, in the eighth embodiment, the coils are wound so that a ratio of the number of winding times between the pair of first coils 10a, positioned at the outer radial side, and the pair of second coils 10b, positioned at the inner radial side, is 3:1, respectively. With such a structure, commutation is improved so that the life (durability) of the brushes can be enhanced, noise can be reduced, and the space factor can be increased as in the sixth embodiment, which allows a further reduction in the diameter of the core 13 and an improvement in performance of the electric motor 1. In addition, a further reduction in size and weight can be realized.

Here, it is the same as in the previous embodiments that the twenty coils 10 are wound so that the coils 10 connected between the brushes 8 of opposite poles face at least a pair of adjoining magnetic poles in corresponding winding directions, respectively. Therefore, magnetic balance entirely in the circumferential direction of the armature 4 is unified, and whirling based on a torque ripple and the like is reduced, thus providing a low-vibration low-noise electric motor 1 with an excellent performance, as mentioned above.

In addition, the electric motor 1 according to a ninth embodiment, shown in FIGS. 17(A)-17(C), is the same as that of the previous embodiments in that the ninth embodiment is formed as an electric motor with four poles, ten slots 6c, and twenty commutator segments 7b. Further there is provided, as an insulating means of a core 14, an insulator 15 formed of an insulating resin material that is attached to the core 14. Additionally, on an inner radial side part 15a of both axial end faces of the insulator 15, is found a plurality of integral guide pins 15b that extend in the axial direction arrayed in the circumferential direction. The guide pins 15b, i.e., twenty guide pins 15b, are formed according to the number of commutator segments 16b of a commutator 16. Also, the commutator 16 is structured in the same manner as that of the eighth embodiment. The guide pins 15b are positioned at the outer radial side of the latching segments 16d which are positioned at the outer radial side of the risers 16c, that are components of the commutator 16. When winding the winding wire 9 around the core 14, to which the insulator 15 has been attached, if the riser 16c around which the winding wire 9 has been connected and the slot 14 to which the same is to be drawn are distant in the circumferential direction, by drawing the winding wire 9 so as to circumvent the outer periphery of the guide pin 15b, interference of the winding wire 9 with the riser 16c or the like is avoided.

FIG. 17(A) shows a pattern view when winding the winding wire 9 by the same process as that of the first embodiment. In this case, the (i-1)th coil 10 (illustrated by a thin line) is created without using the guide pin 15b because the winding wire 9 is positioned at the outer radial side relative to the risers 16c. In the case of the (i-2)th coil 10 (illustrated by a thick line), the winding wire 9 is wound around the slots with the IVth slot 14c therebetween by drawing from the second riser 16c to the IIIrd slot 14c section. Thus, the winding wire 9 is guided to the outer peripheral side using the guide pin 15b, thereby interference between the winding wire 9 and riser 16c is avoided.

Thereby, a low-vibration low-noise electric motor 1 is formed by winding coils 10 around the outer circumference of the core 14 so that the coils 10 connected between the brushes of opposite poles face at least a pair of adjoining magnetic poles in corresponding winding directions, respectively, thereby unifying the magnetic balance entirely in the circumferential direction of the armature 4. Doing so reduces whirling based on a torque ripple and the like, by guiding, as mentioned above, the winding wire 9 drawn along between the slot 14c and commutator 16 to the outer radial side by the guide pin 15b. In such a case, the winding wire 9 never interferes with the riser 16c or latching segment 16d. Moreover, winding expansion is eliminated by drawing the same along the guide pins 15 to achieve a reduction in size.

Also, because the commutator 16, according to the present embodiment, employs a structure that the risers 15c are protruded to the outer diameter side and the winding wire 9 is latched and held by the latching segments 15d, the work for fusing the winding wire 9 with the riser 15c can be carried out from the direction along the axial direction. Thus, there is also an advantage in that workability can be improved.

Here, it is not always necessary to form the guide pins on the insulator. It is sufficient that the guide pins are provided on both axial end portions of the slots as well as at the outer diameter side relative to the risers. It is also possible to provide the guide pins on the commutator side, or on a winding machine for winding winding wires. Furthermore, the guide pins may be provided only when winding winding wires and removed after winding.

In summary, the rotary electric machine according to the disclosure is useful as a component or the like of various actuators mounted on a vehicle, and is particularly suitable for use in a vehicle fan motor.

What is claimed is:

1. An armature of a rotary electric machine, the rotary electric machine comprising:
    an armature on which a plurality of coils are formed by winding a winding wire between two slots, having a predetermined number of slots therebetween, of a plurality of slots provided side by side in a circumferential direction of the armature to conduct an electric current to adjoining commutator segments; and
    a yoke provided with magnetic poles,
    wherein the number of slots are half the number of commutator segments, and
    the coils are formed as a plurality of pairs of coils, each pair of coils respectively conduct an electric current to commutator segments adjoining at both sides in the circumferential direction with reference to an arbitrary commutator segment,
    the pair of coils facing opposite poles positioned different from each other, one coil of the pair of coils being wound in a normal winding state, and the other coil of the pair of coils, in a reverse winding state.

2. The armature of a rotary electric machine according to claim 1, wherein the rotary electric machine is formed with N magnetic poles, n slots, and 2n commutator segments, a pair of coils that respectively conduct an electric current to three commutator segments adjoining at both sides in the circumferential direction with reference to an arbitrary commutator segment have an angle of approximately (360/N), and one coil thereof is wound as a normal winding coil, and the other coil, as a reverse winding coil.

3. The armature of a rotary electric machine according to claim 1, the rotary electric machine comprising N magnetic poles, n slots, and 2n commutator segments, wherein a number (2n/N) obtained by dividing the number of commutator segments by the number of magnetic poles is a natural number, and ((2n/N)-1) coils formed in a manner respectively conducting an electric current to (2n/N) pieces of arbitrary commutator segments adjoining in the circumferential direction have an angle of approximately $\{(1+2m)\times(360/N)\}$ where m is a natural number including 0 and are wound so that a normal winding alternates with a reverse winding.

4. The armature of a rotary electric machine according to claim 1, wherein the coils are wound with one slot therebetween.

5. The armature of a rotary electric machine according to claim 1, wherein the armature comprises two layers of coils wound in the radial direction, and with reference to an arbitrary slot, a pair of first coils in the radial direction to be wound with the arbitrary slot therebetween and a pair of second coils in the radial direction to be wound with a slot adjoining the arbitrary slot therebetween are wound at a winding amount based on a preset ratio.

6. The armature of a rotary electric machine according to claim 5, wherein in the first coils and second coils, each pair of coils are wound with a positional displacement from each other in the radial direction.

7. The armature of a rotary electric machine according to claim 1, wherein adjoining slots are formed so that a groove width of one slot is narrower at an inner diameter side and wider at an outer diameter side and a groove width of the other slot is wider at an inner diameter side and narrower at an outer diameter side.

* * * * *